United States Patent
Dadashikelayeh et al.

(10) Patent No.: US 10,044,638 B2
(45) Date of Patent: *Aug. 7, 2018

(54) METHODS AND SYSTEMS FOR QUANTUM COMPUTING

(71) Applicant: 1QB Information Technologies Inc., Vancouver (CA)

(72) Inventors: Majid Dadashikelayeh, Vancouver (CA); Arman Zaribafiyan, Vancouver (CA); Sahar Karimi, Vancouver (CA); Pooya Ronagh, Vancouver (CA)

(73) Assignee: 1QB INFORMATION TECHNOLOGIES INC., Vancouver, BC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,953

(22) Filed: Dec. 4, 2017

(65) Prior Publication Data

US 2018/0091440 A1 Mar. 29, 2018

Related U.S. Application Data

(63) Continuation-in-part of application No. 15/486,960, filed on Apr. 13, 2017, now Pat. No. 9,870,273,
(Continued)

(51) Int. Cl.
*H04L 12/911* (2013.01)
*G06F 9/48* (2006.01)
(Continued)

(52) U.S. Cl.
CPC ............ *H04L 47/82* (2013.01); *G06F 9/4806* (2013.01); *G06F 9/5083* (2013.01); *G06F 9/54* (2013.01);
(Continued)

(58) Field of Classification Search
CPC ... H04L 63/20; H04L 9/0852; H04L 12/2602; H04L 67/36; H04L 47/82; G06N 99/002; H04B 10/70; G08C 2201/41
See application file for complete search history.

(56) References Cited

U.S. PATENT DOCUMENTS 7,113,967 B2   9/2006   Cleve et al.
7,135,701 B2 * 11/2006   Amin ............... B82Y 10/00
                                                        257/31
(Continued)

FOREIGN PATENT DOCUMENTS

CA    2840958 A1   1/2013
CA    2881033 A1   4/2015
(Continued)

OTHER PUBLICATIONS

Anthony et al. Quadratization of symmetric pseudo-Boolean functions. Discrete Appl. Math. 203:1-12 (2016).
(Continued)

*Primary Examiner* — Sargon Nano
(74) *Attorney, Agent, or Firm* — Wilson, Sonsini, Goodrich & Rosati

(57) ABSTRACT

The present disclosure provides methods, systems, and media for quantum computing, including allowing access to quantum ready and/or quantum enabled computers in a distributed computing environment (e.g., the cloud). Such methods and systems may provide optimization and computational services. Methods and systems of the present disclosure may enable quantum computing to be relatively and readily scaled across various types of quantum computers and users at various locations, in some cases without the need for users to have a deep understanding of the resources, implementation or the knowledge that may be required for solving optimization problems using a quantum computer. Systems provided herein may include user interfaces that
(Continued)

enable users to perform data analysis in a distributed computing environment while taking advantage of quantum technology in the backend.

23 Claims, 14 Drawing Sheets

Related U.S. Application Data which is a continuation-in-part of application No. 15/349,519, filed on Nov. 11, 2016, now Pat. No. 9,660,859, which is a continuation of application No. 15/181,247, filed on Jun. 13, 2016, now Pat. No. 9,537,953, which is a continuation-in-part of application No. 15/165,655, filed on May 26, 2016.

(60) Provisional application No. 62/436,093, filed on Dec. 19, 2016.

(51) Int. Cl.

| | |
|---|---|
| *H04L 29/08* | (2006.01) |
| *G06N 99/00* | (2010.01) |
| *G06F 9/54* | (2006.01) |
| *H04L 12/24* | (2006.01) |
| *G06F 9/50* | (2006.01) |
| *G06F 17/30* | (2006.01) |
| *G06F 21/44* | (2013.01) |
| *G06N 3/00* | (2006.01) |
| *H04L 29/06* | (2006.01) |
| *H04L 12/749* | (2013.01) |

(52) U.S. Cl.
CPC .. *G06F 17/30424* (2013.01); *G06F 17/30557* (2013.01); *G06F 17/30864* (2013.01); *G06F 21/44* (2013.01); *G06N 3/006* (2013.01); *G06N 99/002* (2013.01); *H04L 41/046* (2013.01); *H04L 63/20* (2013.01); *H04L 67/10* (2013.01); *H04L 67/2823* (2013.01); *H04L 45/741* (2013.01); *H04L 63/08* (2013.01)

(56) References Cited

U.S. PATENT DOCUMENTS

| | | | |
|---|---|---|---|
| 7,418,283 B2* | 8/2008 | Amin | G06N 99/002 257/48 |
| 7,533,068 B2* | 5/2009 | Maassen van den Brink | G06N 99/002 706/10 |
| 7,619,437 B2* | 11/2009 | Thom | G06N 99/002 257/30 |
| 7,639,035 B2* | 12/2009 | Berkley | G06N 99/002 326/2 |
| 7,660,533 B1 | 2/2010 | Meyers et al. | |
| 7,898,282 B2* | 3/2011 | Harris | G06N 99/002 326/3 |
| 7,984,012 B2* | 7/2011 | Coury | G06T 11/206 706/62 |
| 8,008,942 B2* | 8/2011 | van den Brink | G06N 99/002 326/4 |
| 8,126,649 B2 | 2/2012 | Frasch et al. | |
| 8,195,596 B2* | 6/2012 | Rose | G06N 99/002 706/45 |
| 8,195,726 B2* | 6/2012 | Macready | B82Y 10/00 708/1 |
| 8,219,605 B2 | 7/2012 | Cowlishaw et al. | |
| 8,230,432 B2 | 7/2012 | Bryant et al. | |
| 8,244,662 B2 | 8/2012 | Coury et al. | |
| 8,283,943 B2* | 10/2012 | van den Brink | G06N 99/002 326/4 |
| 8,421,053 B2* | 4/2013 | Bunyk | B82Y 10/00 257/9 |
| 8,503,885 B2 | 8/2013 | Meyers et al. | |
| 8,655,828 B2 | 2/2014 | Rose | |
| 9,537,953 B1 | 1/2017 | Dadashikelayeh et al. | |
| 9,660,859 B1 | 5/2017 | Dadashikelayeh et al. | |
| 9,727,824 B2* | 8/2017 | Rose | G06N 99/005 |
| 9,870,273 B2 | 1/2018 | Dadashikelayeh et al. | |
| 9,881,256 B2* | 1/2018 | Hamze | G06N 99/002 |
| 2003/0005068 A1 | 1/2003 | Nickel et al. | |
| 2003/0121028 A1 | 6/2003 | Coury et al. | |
| 2004/0267916 A1 | 12/2004 | Chambliss et al. | |
| 2006/0221978 A1 | 10/2006 | Venkatachalam | |
| 2006/0225165 A1 | 10/2006 | Maassen et al. | |
| 2007/0239366 A1* | 10/2007 | Hilton | B82Y 10/00 702/27 |
| 2008/0186918 A1 | 8/2008 | Tinnakornsrisuphap et al. | |
| 2008/0218519 A1 | 9/2008 | Coury et al. | |
| 2008/0262990 A1 | 10/2008 | Kapoor et al. | |
| 2008/0313430 A1* | 12/2008 | Bunyk | B82Y 10/00 712/34 |
| 2009/0078932 A1 | 3/2009 | Amin | |
| 2009/0325694 A1 | 12/2009 | Beckman et al. | |
| 2011/0238855 A1 | 9/2011 | Korsunsky et al. | |
| 2011/0296229 A1 | 12/2011 | Cowlishaw et al. | |
| 2012/0072579 A1 | 3/2012 | Teather | |
| 2012/0240185 A1 | 9/2012 | Kapoor et al. | |
| 2012/0278374 A1 | 11/2012 | Cowlishaw et al. | |
| 2012/0326720 A1 | 12/2012 | Gambetta et al. | |
| 2013/0144925 A1 | 6/2013 | Macready et al. | |
| 2013/0263131 A1 | 10/2013 | Beda, III et al. | |
| 2013/0308956 A1* | 11/2013 | Meyers | H04B 10/11 398/130 |
| 2013/0336472 A1 | 12/2013 | Fahlgren et al. | |
| 2014/0025606 A1 | 1/2014 | Macready | |
| 2014/0122702 A1 | 5/2014 | Jung et al. | |
| 2014/0123325 A1 | 5/2014 | Jung et al. | |
| 2014/0187427 A1* | 7/2014 | Macready et al. | G06N 99/002 505/170 |
| 2014/0214257 A1* | 7/2014 | Williams | G05D 1/00 701/25 |
| 2014/0258730 A1 | 9/2014 | Stecher | |
| 2014/0337612 A1* | 11/2014 | Williams | G06N 99/002 713/100 |
| 2014/0379924 A1 | 12/2014 | Das et al. | |
| 2015/0055961 A1* | 2/2015 | Meyers | B82Y 10/00 398/140 |
| 2015/0120551 A1 | 4/2015 | Jung et al. | |
| 2015/0120555 A1 | 4/2015 | Jung et al. | |
| 2015/0169746 A1 | 6/2015 | Hatami-Hanza | |
| 2015/0178349 A1 | 6/2015 | Niewodniczanski et al. | |
| 2015/0193692 A1 | 7/2015 | Israel | |
| 2015/0220852 A1 | 8/2015 | Hatami-Hanza | |
| 2015/0227559 A1 | 8/2015 | Hatami-Hanza | |
| 2015/0349960 A1 | 12/2015 | Bagley | |
| 2015/0358251 A1 | 12/2015 | Varga et al. | |
| 2016/0071021 A1 | 3/2016 | Raymond | |
| 2016/0171368 A1 | 6/2016 | Aspuru-Guzik et al. | |
| 2016/0224515 A1 | 8/2016 | Ronagh et al. | |
| 2016/0321559 A1 | 11/2016 | Rose et al. | |
| 2016/0328253 A1* | 11/2016 | Majumdar | G06N 99/002 |
| 2017/0011305 A1 | 1/2017 | Williams | |
| 2017/0060642 A1 | 3/2017 | Castellano et al. | |
| 2017/0147303 A1* | 5/2017 | Amy | G06F 8/44 |
| 2017/0147695 A1 | 5/2017 | Shih | |
| 2017/0223143 A1 | 8/2017 | Johnson et al. | |
| 2017/0242824 A1 | 8/2017 | Karimi et al. | |
| 2017/0255872 A1* | 9/2017 | Hamze | G06N 99/002 |
| 2017/0286858 A1 | 10/2017 | La Cour et al. | |
| 2017/0344898 A1 | 11/2017 | Karimi et al. | |
| 2017/0351974 A1 | 12/2017 | Rose et al. | |

FOREIGN PATENT DOCUMENTS

| | | |
|---|---|---|
| CA | 2921711 A1 | 8/2017 |
| WO | WO-2007089674 A2 | 8/2007 |
| WO | WO-2010148120 A2 | 12/2010 |
| WO | WO-2014210368 A1 | 12/2014 |

(56) References Cited

FOREIGN PATENT DOCUMENTS

| | | |
|---|---|---|
| WO | WO-2015060915 A2 | 4/2015 |
| WO | WO-2015121619 A2 | 8/2015 |
| WO | WO-2017152289 A1 | 9/2017 |
| WO | WO-2017201626 A1 | 11/2017 |
| WO | WO-2017214717 A1 | 12/2017 |

OTHER PUBLICATIONS

Babbush et al. Resource Efficient Gadgets for Compiling Adiabatic Quantum Optimization Problems. arXiv:1307.8041v1 [quant-ph] (pp. 1-11) (Jul. 2013) Retrieved from the Internet<https://arxiv.org/pdf/1307.8041.pdf5.
Cai et al. A practical heuristic for finding graph minors.arXiv:1406.2741 [quant-ph] (16 pgs) (2014).
Co-pending U.S. Appl. No. 15/831,967, filed Dec. 5, 2017.
Farhi et al. Quantum Adiabatic Evolution Algorithms versus Simulated Annealing.arXiv.org:quant ph/0201031 pp. 1-16 (2002).
Farhi et al. Quantum computation by adiabatic evolution. arXiv preprint quant-ph/0001106 (24 pgs) (2000).
Grover. A fast quantum mechanical algorithm for database search. Proceedings of the 28th Annual ACM Symposium on the Theory of Computing (pp. 212-219) (1996).
Ishikawa. Transformation of General Binary MRF Minimization to the First-Order Case. IEEE Transactions on Pattern Analysis and Machine Intelligence. 33(6):1234-1249 (2011).
Karimi et al. A subgradient approach for constrained binary programming via quantum adiabatic evolution. arXiv preprint arXiv:1605.09462 (16 pgs.) (2016).
Katzgraber et al. Seeking quantum speedup through spin glasses: the good, the bad, and the ugly. Physical Review 5(3):031026 (2015).
Martinis et al. Rabi oscillations in a large Josephson-junction qubit. Physical Review Letters 89:117901 (2002).
McGeoch et al. Experimental Evaluation of an Adiabatic Quantum System for Combinatorial Optimization. Computing Frontiers. Proceeding CF '13 Proceedings of the ACM International Conference on Computing Frontiers. Article No. 23. Available athttp://www.cs.amherst.edu/ccm/cf14-mcgeoch.pdf (11 pgs) (May 14-16, 2013).
Metz. IBM Is Now Letting Anyone Play With Its Quantum Computer. Wired. (5 pgs.) (May 2016).
O'Gorman et al. Compiling planning into quantum optimization problems: a comparative study. Proc. of the Workshop on Constraint Satisfaction Techniques for Planning and Scheduling Problems (COPLAS-15) (pp. 11-20) (Jun. 2015) Retrieved from the Internet:<https://www.cs.bgu.acilt--icaps15/workshops/Proceedings%2000PLAS%202015.pdf>.
PCT/CA2017/050320 International Search Report and Written Opinion dated Jun. 27, 2017.
PCT/CA2017/050637 International Search Report and Written Opinion dated Aug. 25, 2017.
PCT/CA2017/050709 International Search Report and Written Opinion dated Sep. 19, 2017.
Ronagh et al. Solving constrained quadratic binary problems via quantum adiabatic evolution. arXiv preprint arXiv:1509.05001 (20 pgs.) (2015).
SymPy Python. Internals of the Polynomial Manupulation Module. Available online at http://docs.sympy.org/latest/modules/polys/internals.html (Accessed Jun. 2016) (136 pgs).
The D-Wave 2X™ Quantum Compute Technology Overview (12 pgs) (2015).
U.S. Appl. No. 15/165,655 1st Action Interview dated Feb. 24, 2017.
U.S. Appl. No. 15/165,655 1st Action Interview dated Oct. 25, 2016.
U.S. Appl. No. 15/165,655 Office Action dated Jun. 2, 2017.
U.S. Appl. No. 15/486,960 Office Action dated Jun. 22, 2017.
Van Dam et al. How powerful is adiabatic quantum computation Proceedings 42nd IEEE Symposium on Foundations of Computer Science (pp. 279-287) (Oct. 2001).
Berry et al. Simulating Hamiltonian dynamics with a truncated Taylor series. Phys Rev Lett 114(9):090502 (2015).
Bian et al. The Ising model: teaching an old problem new tricks. D-Wave Systems 2 (32 pgs.) (2010).
Boros et al. On quadratization of pseudo-Boolean functions. arXiv:1404.6538v1 [math.OC] (11 pgs.) (2014).
Boros et al. Pseudo-boolean optimization. Discrete Applied Mathematics 123(1):155-225 (2002).
Co-pending U.S. Appl. No. 15/900,643, filed Feb. 20, 2018.
Montanaro. Quantum walk speedup of backtracking algorithms. arXiv:1509.02374v2 [quant-ph] (23 pgs) (2015).
Suzuki. Fractal decomposition of exponential operators with applications to many-body theories and Monte Carlo simulations. Physics Letters A 146(6):319-323 (1990).
Tran et al. A hybrid quantum-classical approach to solving scheduling problems. AAAI Publications, Ninth Annual Symposium on Combinatorial Search. pp. 98-106 (SoCS 2016).
Trotter. On the product of semi-groups of operators. Proceedings of the American Mathematical Society 10(4):545-551 (1959).
U.S. Appl. No. 15/831,967 Office Action dated Feb. 27, 2018.
PCT/CA2017/051610 International Search Report and Written Opinion dated Mar. 21, 2018.
Tavares et al. New algorithms for Quadratic Unconstrained Binary Optimization (QUBO) with applications in engineering and social sciences. Rutgers University Community Repository. Dissertation—Retrieved from the Internet< URL: https://rucorelibraries-sutgers.edu/rutgers-lib/25771/> on Feb. 2, 2018 (460 pgs) (May 2008).

* cited by examiner

METHODS AND SYSTEMS FOR QUANTUM COMPUTING

CROSS-REFERENCE

This application is a continuation-in-part of U.S. patent application Ser. No. 15/486,960, filed Apr. 13, 2017, which is a continuation-in-part of U.S. patent application Ser. No. 15/349,519, filed Nov. 11, 2016, now U.S. Pat. No. 9,660,859, which is a continuation of U.S. patent application Ser. No. 15/181,247, filed Jun. 13, 2016, now U.S. Pat. No. 9,537,953; U.S. patent application Ser. No. 15/486,960 also claims priority to U.S. Provisional Patent Application No. 62/436,093, filed Dec. 19, 2016; this application is also a continuation-in-part of U.S. patent application Ser. No. 15/165,655, filed May 26, 2016, each of which is entirely incorporated herein by reference.

BACKGROUND

Quantum computers typically make use of quantum-mechanical phenomena, such as superposition and entanglement, to perform operations on data. Quantum computers may be different from digital electronic computers based on transistors. For instance, whereas digital computers require data to be encoded into binary digits (bits), each of which is always in one of two definite states (0 or 1), quantum computation uses quantum bits (qubits), which can be in superpositions of states.

Systems of superconducting qubits are disclosed for instance in U.S. Patent Publication No. 2012/0326720 and U.S. Publication No. 2006/0225165 and manufactured by D-Wave Systems, IBM, and Google. Such analogue systems are used for implementing quantum computing algorithms, for example, the quantum adiabatic computation proposed by Farhi et. al., "Quantum computation by adiabatic evolution" (arXiv:quant-ph/0001106) and Grover's quantum search algorithm by L. Grover, "A fast quantum mechanical algorithm for database search", Proceedings of the 28th Annual ACM Symposium on the Theory of Computing, pp. 212-219 (1996) and also explained in Dam et. al., "How Powerful is Adiabatic Quantum Computation?," (arXiv: quant-ph/0206003), each of which is entirely incorporated herein by reference.

SUMMARY

Systems and methods disclosed herein relate to quantum information processing. The computational capability of a quantum computer is much more powerful than conventional digital computers. Quantum mechanics is now being used to construct a new generation of computers that can solve the most complex scientific problems—and unlock every digital vault in the world. Such quantum computers can perform a computation in a time period (e.g., seconds) that may be significantly less than a time period of a conventional computer to perform the computation. However, the cost of quantum information processing is extremely high. To make quantum computing more accessible to general populations, a new computational infrastructure integrating quantum computers and digital computers is necessary.

Access to quantum computing resources is expensive. Therefore, a new system disclosed herein allows shared access to quantum computing resources. A purpose of the system disclosed herein is to provide quantum computing services (e.g., optimization) on a cloud computing platform. The quantum computing services based on today's technologies have a potential to add additional functionalities as they are developed. Using a software development kit, users are not required to have a deep understanding of the internal architectures and mechanisms of quantum computing resources, implementation, or knowledge required for solving optimization problems using a quantum computer. The system disclosed herein may provide user interfaces for data analysis services on the cloud while taking advantage of quantum technology in a backend.

Systems and methods disclosed herein may be able to improve the quality of computing services with much greater capability, flexibility, and affordable costs. Scalable quantum computers disclosed herein may be complementary to digital computers wherein special-purpose computing resources are programmed or configured for certain classes of problems. Users in need of quantum computing services for their specific computing problems can access quantum-computing resources remotely, such as on the cloud. Users can run algorithms and experiments on quantum computers and processors working with individual quantum bits (qubits). Users may not be required to understand the internal architecture and mechanisms of quantum computing resources. Users' different familiarities with the issues and relevant solutions in their respective practices, such as, for example, weather forecasting, financial analysis, cryptography, logistical planning, search for Earth-like planets, and drug discovery, etc. may provide them a flexibility of accessing different quantum computing resources using methods and systems disclosed herein. Quantum computing services provided through the cloud can provide significantly faster service than digital computers.

Systems and methods provided herein may improve functionality of a quantum computer, such as, for example, by providing remote access to the quantum computer and facilitating the manner in which requests are processed. This can enable quantum computing to be scaled across multiple users at various locations.

The present disclosure provides methods and systems that enable ready access to a quantum computer. Such access may be remote access or local access. The quantum computer may be accessed over a network, such as through a cloud-based interface.

The present disclosure provides systems and methods for quantum information processing. Many methods exist for solving a binary polynomially constrained polynomial programming problem using a system of superconducting qubits. The method disclosed herein can be used in conjunction with any method on any solver for solving a binary polynomially constrained polynomial programming problem to solve a mixed-integer polynomially constrained polynomial programming problem.

Current implementations of quantum devices have limited numbers of superconducting qubits and are furthermore prone to various sources of noise. In practice, this restricts the usage of the quantum device to a limited number of qubits and a limited range of applicable local field biases and couplings strengths. Therefore there is need for methods of efficient encoding of data on the qubits of a quantum device.

Disclosed invention herein relates to quantum information processing. This application pertains to a method for storing integers on superconducting qubits and setting a system of such superconducting qubits having a Hamiltonian representative of a polynomial on a bounded integer domain.

The method disclosed herein can be used as a preprocessing step for solving a mixed integer polynomially constrained polynomial programming problem with a solver for binary polynomially constrained polynomial programming problems. One way to achieve the mentioned conversion is to cast each integer variable x as a linear function of binary variables, $y_i$ for $i=1, \ldots, d$:

$$x = \sum_{i=1}^{d} c_i y_i.$$

The tuple $(c_1, \ldots, c_d)$ is what's referred to as an integer encoding. A few well-known integer encodings are:

Binary Encoding, in which $c_i = 2^{i-1}$.
Unary Encoding, in which $c_i = 1$.
Sequential Encoding, in which $c_i = i$.

Current implementations of quantum devices have limited numbers of superconducting qubits and are furthermore prone to various sources of noise, including thermal and decoherence effects of the environment and the system as disclosed by Katzgraber et. al., "Seeking quantum speedup through spin glasses: the good, the bad, and the ugly" (arXiv:1505.01545v2). In practice, this restricts the usage of the quantum device to a limited number of qubits and a limited range of applicable ferromagnetic biases and couplings.

Consequently the integer encodings formulated above, become incompetent for representing polynomial in several integer variables as the Hamiltonian of the systems mentioned above. The unary encoding suffers from exploiting a large number of qubits and on the other hand, in the binary and sequential encoding the coefficients $c_i$ can be too large and therefore the behavior of the system is affected considerably by the noise.

In an aspect, disclosed herein is a method for setting a system of superconducting qubits having a Hamiltonian representative of a polynomial on a bounded integer domain via bounded-coefficient encoding, the method comprising: using one or more computer processors to obtain (i) the polynomial on the bounded integer domain and (ii) integer encoding parameters; computing a bounded-coefficient encoding using the integer encoding parameters; recasting each integer variable as a linear function of binary variables using the bounded-coefficient encoding, and providing additional constraints on the attained binary variables to avoid degeneracy in the encoding, if required by a user; substituting each integer variable with an equivalent binary representation, and computing the coefficients of the equivalent binary representation of the polynomial on the bounded integer domain; performing a degree reduction on the obtained equivalent binary representation of the polynomial on the bounded integer domain to provide an equivalent polynomial of degree at most two in binary variables; and setting local field biases and coupling strengths on the system of superconducting qubits using the coefficients of the derived polynomial of degree at most two in several binary variables. In some embodiments, the polynomial on a bounded integer domain is a single bounded integer variable. In further embodiments, setting local field biases and coupling strengths comprises assigning a plurality of qubits to have a plurality of corresponding local field biases; each local field bias corresponding to each of the qubits in the plurality of qubits is provided using the parameters of the integer encoding. In some embodiments, the polynomial on a bounded integer domain is a linear function of several bounded integer variables. In further embodiments, setting local field biases and coupling strengths comprises assigning a plurality of qubits to have a plurality of corresponding local field biases; each local field bias corresponding to each of the qubits in the plurality of qubits is provided using the linear function and parameters of the integer encoding. In some embodiments, the polynomial on a bounded integer domain is a quadratic polynomial of several bounded integer variables. In further embodiments, setting local field biases and coupling strengths comprises embedding the equivalent binary representation of the polynomial of degree at most two on a bounded integer domain to the layout of a system of superconducting qubits comprising local fields on each of the plurality of the superconducting qubits and couplings in a plurality of pairs of the plurality of the superconducting qubits. In some embodiments, the system of superconducting qubits is a quantum annealer. In further embodiments, the method comprises performing an optimization of the polynomial on a bounded integer domain via bounded-coefficient encoding. In further embodiments, the optimization of the polynomial on a bounded integer domain via bounded-coefficient encoding is obtained by quantum adiabatic evolution of an initial transverse field on the superconducting qubits to the final Hamiltonian on a measurable axis. In further embodiments, the optimization of the polynomial on a bounded integer domain via bounded-coefficient encoding comprises: providing the equivalent polynomial of degree at most two in binary variables; providing a system of non-degeneracy constraints; and solving the problem of optimization of the equivalent polynomial of degree at most two in binary variables subject to the system of nondegeneracy constraints as a binary polynomially constrained polynomial programming problem. In some embodiments, the method comprises solving a polynomially constrained polynomial programming problem on a bounded integer domain via bounded-coefficient encoding. In some embodiments, solving the polynomially constrained polynomial programming problem on a bounded integer domain via bounded-coefficient encoding is obtained by quantum adiabatic evolution of an initial transverse field on the superconducting qubits to the final Hamiltonian on a measurable axis. In further embodiments, solving the polynomially constrained polynomial programming problem on a bounded integer domain via bounded-coefficient encoding comprises: computing the bounded-coefficient encoding of the objective function and constraints of the polynomially constrained polynomial programming problem using the integer encoding parameters to obtain an equivalent polynomially constrained polynomial programming problem in several binary variables; providing a system of non-degeneracy constraints; adding the system of non-degeneracy constraints to the constraints of the obtained polynomially constrained polynomial programming problem in several binary variables; and solving the problem of optimization of the obtained polynomially constrained polynomial programming problem in several binary variables. In some embodiments, the obtaining of integer encoding parameters comprises obtaining an upper bound on the coefficients of the bounded-coefficient encoding directly. In some embodiments, the obtaining of integer encoding parameters comprises obtaining an upper bound on the coefficients of the bounded-coefficient encoding based on error tolerances $\in_l$ and $\in_c$ of local field biases and couplings strengths of the system of superconducting qubits. In some embodiments, obtaining an upper bound on the coefficient of the bounded-coefficient encoding comprises finding a feasible solution to a system of inequality constraints.

In another aspect, disclosed herein is a system comprising: a sub-system of superconducting qubits; a computer operatively coupled to the sub-system of superconducting qubits, wherein the computer comprises at least one computer processor, an operating system configured to perform executable instructions, and a memory; and a computer program including instructions executable by the at least one computer processor to generate an application for setting the sub-system of superconducting qubits having a Hamiltonian representative of a polynomial on a bounded integer domain via bounded-coefficient encoding, the application comprising: a software module programmed or otherwise configured to obtain the polynomial on the bounded integer domain; a software module programmed or otherwise configured to obtain integer encoding parameters; a software module programmed or otherwise configured to compute a bounded-coefficient encoding using the integer encoding parameters; a software module programmed or otherwise configured to recast each integer variable as a linear function of binary variables using the bounded-coefficient encoding, and providing additional constraints on the attained binary variables to avoid degeneracy in the encoding, if required by a user; a software module programmed or otherwise configured to substitute each integer variable with an equivalent binary representation, and compute the coefficients of the equivalent binary representation of the polynomial on the bounded integer domain; a software module programmed or otherwise configured to perform a degree reduction on the obtained equivalent binary representation of the polynomial on the bounded integer domain to provide an equivalent polynomial of degree at most two in binary variables; and a software module programmed or otherwise configured to set local field biases and coupling strengths on the system of superconducting qubits using the coefficients of the derived polynomial of degree at most two in several binary variables. In some embodiments, the polynomial on a bounded integer domain is a single bounded integer variable. In further embodiments, setting local field biases and coupling strengths comprises assigning a plurality of qubits to have a plurality of corresponding local field biases; each local field bias corresponding to each of the qubits in the plurality of qubits is provided using the parameters of the integer encoding. In some embodiments, the polynomial on a bounded integer domain is a linear function of several bounded integer variables. In further embodiments, setting local field biases and coupling strengths comprises assigning a plurality of qubits to have a plurality of corresponding local field biases; each local field bias corresponding to each of the qubits in the plurality of qubits is provided using the linear function and parameters of the integer encoding. In some embodiments, the polynomial on a bounded integer domain is a quadratic polynomial of several bounded integer variables. In further embodiments, setting local field biases and coupling strengths comprises embedding the equivalent binary representation of the polynomial of degree at most two on a bounded integer domain to the layout of a system of superconducting qubits comprising local fields on each of the plurality of the superconducting qubits and couplings in a plurality of pairs of the plurality of the superconducting qubits. In some embodiments, the system of superconducting qubits is a quantum annealer. In further embodiments, the system comprises performing an optimization of the polynomial on a bounded integer domain via bounded-coefficient encoding. In further embodiments, the optimization of the polynomial on a bounded integer domain via bounded-coefficient encoding is obtained by quantum adiabatic evolution of an initial transverse field on the superconducting qubits to the final Hamiltonian on a measurable axis. In further embodiments, the optimization of the polynomial on a bounded integer domain via bounded-coefficient encoding comprises: providing the equivalent polynomial of degree at most two in binary variables; providing a system of non-degeneracy constraints; and solving the problem of optimization of the equivalent polynomial of degree at most two in binary variables subject to the system of non-degeneracy constraints as a binary polynomially constrained polynomial programming problem. In some embodiments, the system comprises solving a polynomially constrained polynomial programming problem on a bounded integer domain via bounded-coefficient encoding. In some embodiments, solving the polynomially constrained polynomial programming problem on a bounded integer domain via bounded-coefficient encoding is obtained by quantum adiabatic evolution of an initial transverse field on the superconducting qubits to the final Hamiltonian on a measurable axis. In further embodiments, solving the polynomially constrained polynomial programming problem on a bounded integer domain via bounded-coefficient encoding comprises: computing the bounded-coefficient encoding of the objective function and constraints of the polynomially constrained polynomial programming problem using the integer encoding parameters to obtain an equivalent polynomially constrained polynomial programming problem in several binary variables; providing a system of non-degeneracy constraints; adding the system of non-degeneracy constraints to the constraints of the obtained polynomially constrained polynomial programming problem in several binary variables; and solving the problem of optimization of the obtained polynomially constrained polynomial programming problem in several binary variables. In some embodiments, the obtaining of integer encoding parameters comprises obtaining an upper bound on the coefficients of the bounded-coefficient encoding directly. In some embodiments, the obtaining of integer encoding parameters comprises obtaining an upper bound on the coefficients of the bounded-coefficient encoding based on error tolerances $\in_l$ and $\in_c$ of local field biases and couplings strengths of the system of superconducting qubits. In some embodiments, obtaining an upper bound on the coefficient of the bounded-coefficient encoding comprises finding a feasible solution to a system of inequality constraints.

In another aspect, disclosed herein is a non-transitory computer-readable medium comprising machine-executable code that, upon execution by one or more computer processors, implements a method for setting a system of superconducting qubits having a Hamiltonian representative of a polynomial on a bounded integer domain via bounded-coefficient encoding, the method comprising: using one or more computer processors to obtain (i) the polynomial on the bounded integer domain and (ii) integer encoding parameters; computing the bounded-coefficient encoding using the integer encoding parameters; recasting each integer variable as a linear function of binary variables using the bounded-coefficient encoding, and providing additional constraints on the attained binary variables to avoid degeneracy in the encoding, if required by a user; substituting each integer variable with an equivalent binary representation, and computing the coefficients of the equivalent binary representation of the polynomial on the bounded integer domain; performing a degree reduction on the obtained equivalent binary representation of the polynomial on the bounded integer domain to provide an equivalent polynomial of degree at most two in binary variables; and setting local field biases and coupling strengths on the system of superconducting qubits using the coefficients of the derived polynomial of degree at most two in several binary variables.

Disclosed is a method for setting a system of superconducting qubits having a Hamiltonian representative of a polynomial on a bounded integer domain via bounded-coefficient encoding, the method comprising obtaining (i)

the polynomial on the bounded integer domain and (ii) integer encoding parameters; computing the bounded-coefficient encoding using the integer encoding parameters; recasting each integer variable as a linear function of binary variables using the bounded-coefficient encoding, and providing additional constraints on the attained binary variables to avoid degeneracy in the encoding, if required by a user; substituting each integer variable with an equivalent binary representation, and computing the coefficients of the equivalent binary representation of the polynomial on the bounded integer domain; performing a degree reduction on the obtained equivalent binary representation of the polynomial on the bounded integer domain to provide an equivalent polynomial of degree at most two in binary variables; and setting local field biases and coupling strengths on the system of superconducting qubits using the coefficients of the derived polynomial of degree at most two in several binary variables.

In some embodiments, the obtaining of a polynomial in n variables on a bounded integer domain comprises of providing the plurality of terms in the polynomial; each term of the polynomial further comprises of the coefficient of the term and a list of size n representative of the power of each variables in the term in the matching index. The obtaining of a polynomial on a bounded integer domain further comprises of obtaining a list of upper bounds on each integer variable.

In a particular case where the provided polynomial is of degree at most two, the obtaining of a polynomial on bounded domain comprises of providing coefficients $q_i$ of each linear term $x_i$ for $i=1, \ldots, n$, and coefficients $Q_{ij}+Q_{ji}$ of each quadratic term $x_i x_j$ for all choices of distinct elements $\{i,j\} \subseteq \{1, \ldots, n\}$ and an upper bound on each integer variable.

In some embodiments, the obtaining of integer encoding parameters comprises of either obtaining an upper bound on the value of the coefficients of the encoding directly; or obtaining the error tolerance $\in_l$ and $\in_c$ of the local field biases and couplings, respectively, and computing the upper bound of the coefficients of the encoding from these error tolerances. This application proposes a technique for computing upper bound of the coefficients of the encoding from $\in_l$ and $\in_c$ for the special case that the provided polynomial is of degree at most two.

In some embodiments, the integer encoding parameters are obtained from at least one of a user, a computer, a software package and an intelligent agent.

In some embodiments, the bounded-coefficient encoding is derived and the integer variables are represented as a linear function of a set of binary variables using the bounded-coefficient encoding, and a system of non-degeneracy constraints is returned.

In another aspect, disclosed is a digital computer comprising: a central processing unit; a display device; a memory unit comprising an application for storing data and computing arithmetic operations; and a data bus for interconnecting the central processing unit, the display device, and the memory unit.

In another aspect, there is disclosed a non-transitory computer-readable storage medium for storing computer-executable instructions which, when executed, cause a digital computer to perform arithmetic and logical operations.

In another aspect, there is disclosed a system of superconducting qubits comprising: a plurality of superconducting qubits; a plurality of couplings between a plurality of pairs of superconducting qubits; a quantum device control system capable of setting local field biases on each of the superconducting qubits and couplings strengths on each of the couplings.

The method disclosed herein makes it possible to represent a polynomial on a bounded integer domain on a system of superconducting qubits. The method comprises of obtaining (i) the polynomial on the bounded integer domain and (ii) integer encoding parameters; computing the bounded-coefficient encoding using the integer encoding parameters; recasting each integer variable as a linear function of binary variables using the bounded-coefficient encoding, and providing additional constraints on the attained binary variables to avoid degeneracy in the encoding, if required by a user; substituting each integer variable with an equivalent binary representation, and computing the coefficients of the equivalent binary representation of the polynomial on the bounded integer domain; performing a degree reduction on the obtained equivalent binary representation of the polynomial on the bounded integer domain to provide an equivalent polynomial of degree at most two in binary variables; and setting local field biases and coupling strengths on the system of superconducting qubits using the coefficients of the derived polynomial of degree at most two in several binary variables.

In some embodiments of this application, the method disclosed herein makes it possible to find the optimal solution of a mixed integer polynomially constrained polynomial programming problem through solving its equivalent binary polynomially constrained polynomial programming problem. In one embodiment, solving a mixed integer polynomially constrained polynomial programming problem comprises finding a binary representation of all polynomials appearing the objective function and the constraints of the problem using the bounded-coefficient encoding and applying the methods disclosed in U.S. patent application Ser. No. 15/051,271, U.S. patent application Ser. No. 15/014,576, CA Patent Application No. 2921711 and CA Patent Application No. 2881033, each of which is entirely incorporated herein by reference, to the obtained equivalent binary polynomially constrained polynomial programming problem.

In yet another aspect, the present disclosure provides a method for using a digital computer to generate and direct a computational task to a quantum computing resource comprising at least one quantum computer over a network, wherein the digital computer comprises at least one computer processor and at least one computer memory, the method comprising: retrieving a programming problem from the computer memory of the digital computer; using the at least one computer processor of the digital computer to generate an equivalent of the programming problem; generating a request comprising the equivalent of the programming problem generated by the at least one computer processor of the digital computer; and directing the request from the digital computer to the quantum computing resource over the network, wherein the equivalent of the programming problem is usable by the at least one quantum computer of the quantum computing resource to solve the programming problem.

In some embodiments, the request is directed from the digital computer to the quantum computing resource through a cloud-based interface. In some embodiments, the network is a local network. In some embodiments, the at least one quantum computer performs one or more quantum algorithms to the programming problem.

In some embodiments, the request is generated using an application programming interface (API).

In some embodiments, wherein the method further comprises obtaining (i) a polynomial on a bounded integer domain and (ii) integer encoding parameters, and computing a bounded-coefficient encoding using the integer encoding parameters. In some embodiments, the method further comprises using the one or more computer processors to transform each integer variable of the polynomial to a linear function of binary variables using the bounded-coefficient encoding. In some embodiments, the method further comprises providing constraints on the binary variables to avoid degeneracy in the bounded-coefficient encoding, if required by a user. In some embodiments, the method further comprises substituting each integer variable of the polynomial with an equivalent binary representation, and using the at least one computer processor to compute coefficients of an equivalent binary representation of the polynomial on the bounded integer domain. In some embodiments, the method further comprises performing a degree reduction on the equivalent binary representation of the polynomial on the bounded integer domain to generate an equivalent polynomial. In some embodiments, the equivalent polynomial is of a degree of at most two in binary variables. In some embodiments, the method further comprises setting local field biases and coupling strengths on the at least one quantum computer using the coefficients of the equivalent polynomial of the degree of at most two in binary variables to generate the equivalent of the programming problem. In some embodiments, the equivalent of the programming problem comprises a Hamiltonian representative of the polynomial on the bounded integer domain. In some embodiments, the Hamiltonian is usable by the at least one quantum computer to solve the programming problem.

In yet another aspect, the present disclosure provides a system comprising a digital computer for generating and directing a computational task to a quantum computing resource comprising at least one quantum computer over a network, wherein the digital computer comprises at least one computer processor and at least one computer memory, wherein the at least one computer processor is programmed to: retrieve a programming problem from the computer memory of the digital computer; use the at least one computer processor of the digital computer to generate an equivalent of the programming problem; generate a request comprising the equivalent of the programming problem generated by the at least one computer processor of the digital computer; and direct the request from the digital computer to the quantum computing resource over the network, wherein the equivalent of the programming problem is usable by the at least one quantum computer of the quantum computing resource to solve the programming problem.

In some embodiments, the at least one computer processor is programmed to direct the request from the digital computer to the quantum computing resource through a cloud-based interface. In some embodiments, the network is a local network.

In some embodiments, the at least one computer processor is programmed to obtain (i) a polynomial on a bounded integer domain and (ii) integer encoding parameters, and compute a bounded-coefficient encoding using the integer encoding parameters. In some embodiments, the at least one computer processor is programmed to (i) transform each integer variable of the polynomial to a linear function of binary variables using the bounded-coefficient encoding, and (ii) substitute each integer variable of the polynomial with an equivalent binary representation, and using the at least one computer processor to compute coefficients of an equivalent binary representation of the polynomial on the bounded integer domain. In some embodiments, the at least one computer processor is programmed to perform a degree reduction on the equivalent binary representation of the polynomial on the bounded integer domain to generate an equivalent polynomial, wherein the equivalent polynomial is of a degree of at most two in binary variables. In some embodiments, the at least one computer processor is programmed to set local field biases and coupling strengths on the at least one quantum computer using the coefficients of the equivalent polynomial of the degree of at most two in binary variables to generate the equivalent of the programming problem. In some embodiments, the equivalent of the programming problem comprises a Hamiltonian representative of the polynomial on the bounded integer domain. In some embodiments, the Hamiltonian is usable by the at least one quantum computer to solve the programming problem.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
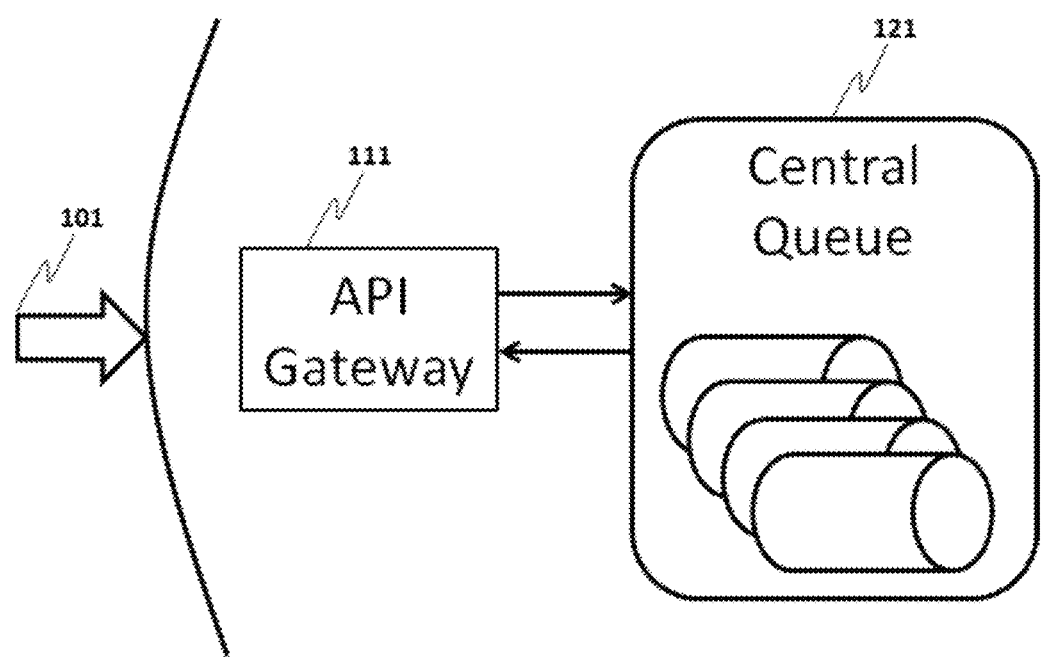
FIG. 1 shows a non-limiting example of an Application Program Interface (API) gateway and a queuing unit.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Methods and Systems for Non-Classical Computing on the Cloud

Quantum computing resources may be rare. Access to quantum computing resources may be expensive or such quantum computing resources may be inaccessible given geographic limitations. Even though a user may have direct access to a quantum computer, the user may be required to possess sophisticated expertise to configure the quantum computer and/or choose an adequate quantum algorithm for solving a computational task; otherwise, the user does not gain the benefit from the speedy computations offered by the quantum computer. Even a superior quantum computer may not exhibit any advantage over classical computing resources in solving a problem if the right algorithm, the right problem, and the right parameters are not chosen. On the other hand, from a user's perspective, a computational problem may be a very large computational task involving many smaller sub-tasks. Each of these sub-tasks may possess a different complexity characteristic. Therefore, using the right computing resource, the right algorithm, and the right parameter may be essential to solve the original problem efficiently and/or benefit from the potential quantum speedup.

The present disclosure provides systems and methods that offer quantum-ready services and/or quantum-enabled services. Quantum-ready services may advantageously make it easier for a user to manage quantum resources and switch between a classical or quantum computation resource. Additionally, a quantum-enabled framework may allow users to use both classical and quantum resources in a hybrid manner such that the framework intelligently chooses the right solver and the right parameters for each particular subproblem or subtask.

The present disclosure provides systems and methods that may allow shared or distributed access to quantum computing resources (e.g., a quantum-ready or quantum-enabled services). The disclosed system may provide quantum computing services (e.g., optimization based on quantum algorithms) on a cloud computing platform. Using a software development kit (SDK), users may not be required to have a deep understanding of the quantum computing resources, implementation, or the knowledge required for solving optimization problems using a quantum computer. For example, use of an SDK to provide a user with shared or distributed access to quantum computing resources is disclosed in PCT International Application PCT/CA2017/050320, "Methods and Systems for Quantum Computing," which is entirely incorporated herein by reference.

The present disclosure provides systems and methods for facilitating quantum computing in a distributed environment, such as over a network (e.g., in the cloud). For example, a user at a first location may submit a request for a calculation or task to be performed by a quantum computer (e.g., an adiabatic quantum computer) at a second location that is remotely located with respect to the first location. The request may be directed over a network to one or more computer servers, which subsequently direct a request to the quantum computer to perform the calculation or task.

Provided herein are systems and methods that provide optimization services in a distributed computing environment (e.g., the cloud), which may utilize quantum computing technology, such as an adiabatic quantum computer. Methods and systems of the present disclosure enable quantum computing to be relatively and readily scaled across various types of quantum computers and users in various locations, in some cases without a need for users to have a deep understanding of the resources, implementation, or the knowledge required for solving optimization problems using a quantum computer. Systems provided herein may include user interfaces that enable users to perform data analysis in a distributed computing environment (e.g., in the cloud) while taking advantage of quantum technology in the backend.

In some embodiments, systems, media, networks, and methods include a quantum computer, or use of the same. Quantum computation uses quantum bits (qubits), which can be in superpositions of states. A quantum Turing machine is a theoretical model of such a computer, and is also known as a universal quantum computer. Quantum computers share theoretical similarities with non-deterministic and probabilistic computers.

In some embodiments, a quantum computer comprises one or more quantum processors. A quantum computer may be configured to perform one or more quantum algorithms. A quantum computer may store or process data represented by quantum bits (qubits). A quantum computer may be able to solve certain problems much more quickly than any classical computers that use even the best currently available algorithms, like integer factorization using Shor's algorithm or the simulation of quantum many-body systems. There exist quantum algorithms, such as Simon's algorithm, that run faster than any possible probabilistic classical algorithm. Examples of quantum algorithms include, but are not limited to, quantum optimization algorithms, quantum Fourier transforms, amplitude amplifications, quantum walk algorithms, and quantum evolution algorithms. Quantum computers may be able to efficiently solve problems that no classical computer may be able to solve within a reasonable amount of time. Thus, a system disclosed herein utilizes the merits of quantum computing resources to solve complex problems.

Any type of quantum computers may be suitable for the technologies disclosed herein. Examples of quantum computers include, but are not limited to, adiabatic quantum computers, quantum gate arrays, one-way quantum computer, topological quantum computers, quantum Turing machines, superconductor-based quantum computers, trapped ion quantum computers, optical lattices, quantum dot computers, spin-based quantum computers, spatial-based quantum computers, Loss-DiVincenzo quantum computers, nuclear magnetic resonance (NMR) based quantum computers, liquid-NMR quantum computers, solid state NMR Kane quantum computers, electrons-on-helium quantum computers, cavity-quantum-electrodynamics based quantum computers, molecular magnet quantum computers, fullerene-based quantum computers, linear optical quantum computers, diamond-based quantum computers, Bose-Einstein condensate-based quantum computers, transistor-based quantum computers, and rare-earth-metal-ion-doped inorganic crystal based quantum computers. A quantum computer may comprise one or more of: a quantum annealer, an Ising solver, an optical parametric oscillator (OPO), or a gate model of quantum computing.

A system of the present disclosure may include or employ quantum-ready or quantum-enabled computing systems. A quantum-ready computing system may comprise a digital computer operatively coupled to a quantum computer. The quantum computer may be configured to perform one or more quantum algorithms. A quantum-enabled computing system may comprise a quantum computer and a classical computer, the quantum computer and the classical computer operatively coupled to a digital computer. The quantum computer may be configured to perform one or more quantum algorithms for solving a computational problem. The classical computer may comprise at least one classical processor and computer memory, and may be configured to perform one or more classical algorithms for solving a computational problem.

The term "quantum annealer" and like terms generally refer to a system of superconducting qubits that carries optimization of a configuration of spins in an Ising spin model using quantum annealing, as described, for example, in Farhi, E. et al., "Quantum Adiabatic Evolution Algorithms versus Simulated Annealing" arXiv.org: quant ph/0201031 (2002), pp. 1-16. An embodiment of such an analog processor is disclosed by McGeoch, Catherine C. and Cong Wang, (2013), "Experimental Evaluation of an Adiabatic Quantum System for Combinatorial Optimization" Computing Frontiers," May 14-16, 2013 (http://www.cs.amherst.edu/ccm/cf14-mcgeoch.pdf) and also disclosed in U.S. Patent Application Publication Number US 2006/0225165.

In some embodiments, a classical computer may be configured to perform one or more classical algorithms. A classical algorithm (or classical computational task) may be an algorithm (or computational task) that is able to be executed by one or more classical computers without the use of a quantum computer, a quantum-ready computing service, or a quantum-enabled computing service. A classical algorithm may be a non-quantum algorithm. A classical computer may be a computer which does not comprise a quantum computer, a quantum-ready computing service, or a quantum-enabled computer. A classical computer may process or store data represented by digital bits (e.g., zeroes ("0") and ones ("1")) rather than quantum bits (qubits). Examples of classical computers include, but are not limited to, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles.

In an aspect, the present disclosure provides a system for quantum-ready optimization. The computing system may comprise a digital computer operatively coupled to a remote quantum computer over a network. The quantum computer may be configured to perform one or more quantum algorithms. The digital computer may comprise at least one computer processor and computer memory. The computer memory may include a computer program with instructions executable by the at least one computer processor to render an application. The application may facilitate use of the quantum computer by a user.

In another aspect, the present disclosure provides a system for quantum-enabled optimization. The computing system may comprise a quantum computer and a classical computer, the quantum computer and the classical computer operatively coupled to a digital computer over a network. The quantum computer may be configured to perform one or more quantum algorithms for solving a computational problem. The classical computer may comprise at least one classical processor and computer memory, and may be configured to perform one or more classical algorithms for solving a computational problem. The digital computer may comprise at least one computer processor and computer memory, wherein the digital computer may include a computer program with instructions executable by the at least one computer processor to render an application. The application may facilitate use of the quantum computer and/or the classical computer by a user.

Some implementations may use quantum computers along with classical computers operating on bits, such as personal desktops, laptops, supercomputers, distributed computing, clusters, cloud-based computing resources, smartphones, or tablets.

The system may include a gateway programmed or configured to receive a request over the network. The request may comprise a computational task. Examples of a computational task include, but are not limited to, search, optimization, statistical analysis, modeling, data processing, etc. In some embodiments, a request may comprise a dataset; for example, a data matrix including variables and observations for creating a modeling or analyzing statistics of the data set. Further, a solution may be derived; for example, an optimal model underlying a given dataset is derived from a quantum computer; a statistical analysis is performed by a quantum computer.

The system may comprise a queuing unit programmed or configured to store and order the request in one or more queues. The system may comprise a cluster manager programmed or configured to create an instance/container (also "worker" herein) to (1) translate the request in the queue into one or more quantum machine instructions, (2) deliver the one or more quantum machine instructions to the quantum computer over the network to perform the computational task, and (3) receive one or more solutions from the quantum computer. The one or more solutions may be stored in a database of the system. The system may comprise a logging unit programmed or configured to log an event of the worker.

The system may comprise an interface for a user. In some embodiments, the interface may comprise an application programming interface (API). The interface may provide a programmatic model that abstracts away (e.g., by hiding from the user) the internal details (e.g., architecture and operations) of the quantum computer. In some embodiments, the interface may minimize a need to update the application programs in response to changing quantum hardware. In some embodiments, the interface may remain unchanged when the quantum computer has a change in internal structure.

Gateway

Systems, media, networks, and methods of the present disclosure may comprise a gateway that may be programmed or configured to receive a request from a user. The request may comprise a computational task. In some embodiments, the gateway is programmed or configured to authenticate a user of the system. In some embodiments, the gateway is programmed or configured to monitor system and data security. As an example, a gateway may use secure sockets layer (SSL) for encrypting requests and responses. In some embodiments, a gateway is programmed or configured to route the request to one of the at least one digital processor. In some embodiments, a gateway is programmed or configured to monitor data traffic.

In some embodiments, the systems, media, networks, and methods comprise a queuing unit. In some embodiments, a queuing unit is programmed or configured to place the request in the queue. When a queue comprises more than one request, the more than one requests may be placed in order. The order may be based on first-in-first-out, or based on timing, or based on available quantum computing resources. In some embodiments, a queuing unit is further programmed or configured to reorder the request in the queue. In some embodiments, a queuing unit is responsible for preventing message loss. The tasks submitted may be stored in the queue and may be accessed in order by the microservices that need to work with them.

A gateway may be a microservice used for authentication, routing, security, and monitoring purposes. Referring to FIG. 1, a request 101 is received by an application programming interface (API) gateway 111 and then forwarded through to one or more target microservices. In some embodiments, when the target microservices are not available immediately, the request 101 may be first handled by a queuing unit 121 which places the request in a queue. In some cases, a request is pushed into the queue 121 or inserted into the queue 121. In some embodiments, a request in the queue 121 is reordered based on priorities of computational tasks. For instance, if a new incoming request has a same computational task as the request at the top of the queue, to save quantum computing resources, it may be better to have the new request being executed concurrently with the top queue, so the queuing unit places the new request at the top of the queue as well.

In some embodiments, the systems, media, networks, and methods described herein comprise a database service, or use of the same. In some embodiments, a database is programmed or configured to store a data set in the request.

In some embodiments, a database in the microservices is in charge of storing persistent data. In some embodiments, solutions to solved problems are maintained by the database.

Figure 2:
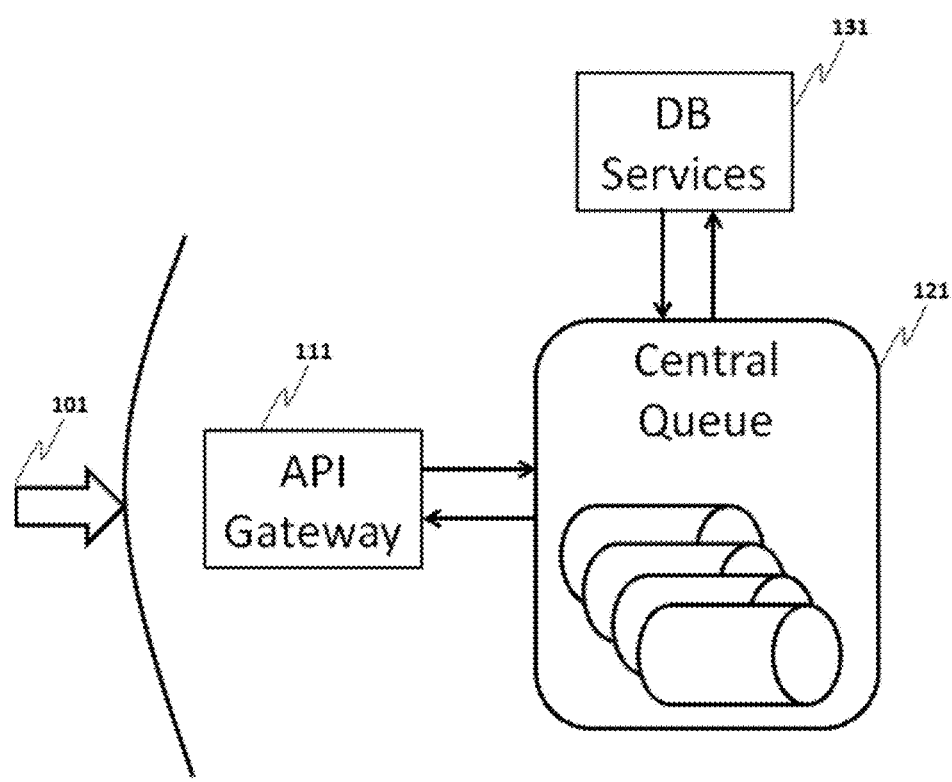
FIG. 2 shows a non-limiting example of an API gateway, a queuing unit, and a database service.

Referring to FIG. 2, a database 131 communicates with the queuing unit 121. In some embodiments, status of a worker or a quantum computing resource (e.g., availabilities, reading, writing, queuing, algorithms to be executed, algorithms having been performed, and timestamps) are stored in the database 131. In some embodiments, data sent along with a request are stored in the database 131 as well. Persistent data and solutions to solved tasks may be stored in the database 131.

In some embodiments, the quantum-ready system disclosed herein comprises one or more databases, or use of the same. Many types of databases may be suitable for storage and retrieval of application information. In some embodiments, suitable databases include, by way of non-limiting examples, relational databases, non-relational databases, object oriented databases, object databases, entity-relationship model databases, associative databases, and XML databases. In some embodiments, a database is internet-based. In some embodiments, a database is web-based. In some embodiments, a database is cloud computing-based (e.g., on the cloud). In other embodiments, a database is based on one or more local computer storage devices.

In some embodiments, a system may comprise a serialization unit configured to communicate problem instances from the user to the quantum computer through the gateway. On the other hand, the serialization unit may be programmed or configured to communicate computed solutions to those instances from the quantum computer back to the user through the gateway. The serialization mechanism may be based on JavaScript Object Notation (JSON), eXtensible Markup Language (XML), or other markup languages; however, an entirely new format for the serialization may be used. In some embodiments, the serialization mechanism may comprise transmitting texts or binary files. In some embodiments, the serialization mechanism may or may not be encrypted. In some embodiments, the serialization mechanism may or may not be compressed.

In some embodiments, a system may comprise a user interface configured to allow a user to submit a request to solve a computational task. A user may specify the task and submit associated datasets. The user interface may transmit the request and the datasets to the gateway. The gateway may then process the request based on the technologies disclosed herein. When solutions are derived by a quantum computer, the gateway may send a notification to the user. The user may retrieve the solutions via the user interface.

Cluster Manager

In some embodiments, the systems, media, networks, and methods described herein comprise a cluster manager. The cluster manager may be programmed or configured to translate the request into quantum machine instructions. In some embodiments, the cluster manager delivers the quantum machine instructions to a quantum processor to perform the computational task. In addition, the cluster manager receives one or more solutions from the quantum processor.

In some embodiments, a cluster manager is programmed to divide the computational task into two or more computational components. In some embodiments, a computational component corresponds to a quantum algorithm. In some embodiments, the two or more computational components are translated into one or more quantum algorithms, or translated into quantum machine instructions.

In some embodiments, translating into quantum machine instructions comprises determination of a number of qubits and/or determination of a quantum operator. In some embodiments, two or more computational components are executed by the quantum computer sequentially, in parallel, or both thereof.

In some embodiments, a cluster manager is programmed or configured to aggregate solutions of the two or more computational components. In some embodiments, a cluster manager is further programmed or configured to control a start and a termination of the computational task. Further, a cluster manager may be programmed or configured to monitor a lifetime of the computational task.

Figure 3:
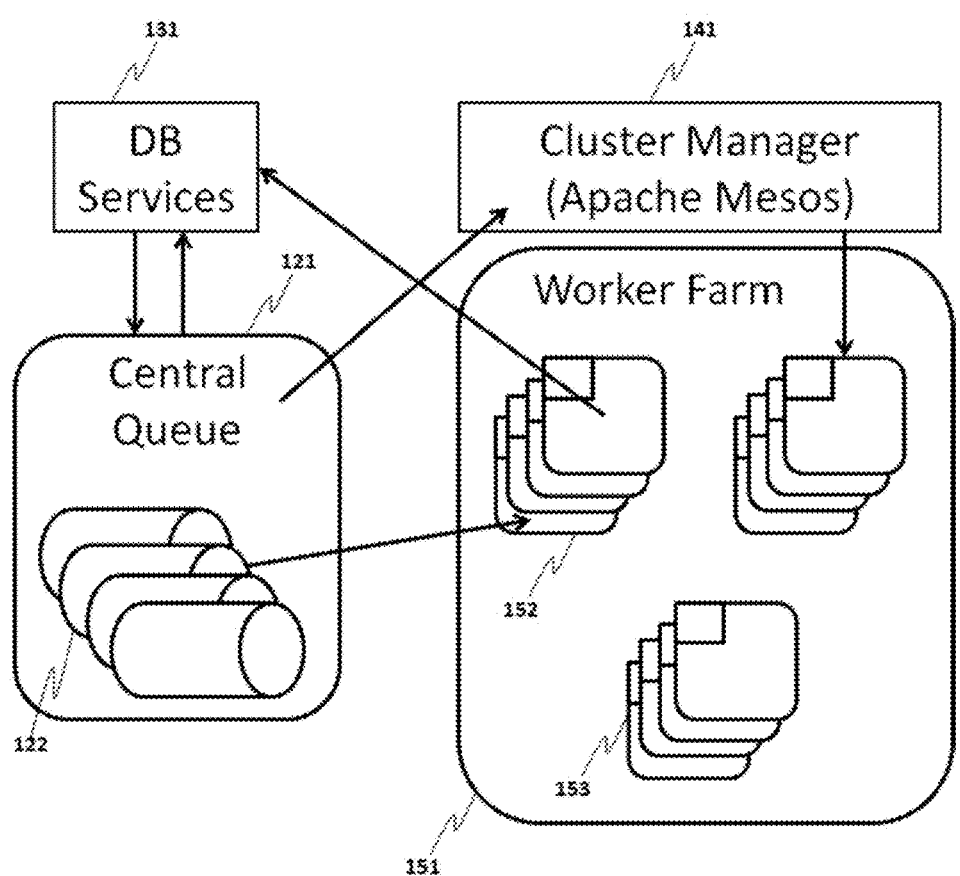
FIG. 3 shows a non-limiting example of a queuing unit, database service, and a cluster manager.

Referring to FIG. 3, the central queue 121 transmits the recent state of the queue to the cluster manager 141. In this example, the cluster manager 141 is realized by an Apache Mesos server. The cluster manager 141 starts and controls a lifetime of certain types of computational components. The cluster manager starts instances/containers (called workers) that are able to perform the operations (e.g., translating to specific quantum computing instructions, controlling quantum computers/processors 201 to execute computational tasks, etc.) required by the queue entries. For instance, a worker 152 is assigned to process a request 122. If the worker 152 is successful, it sends a result of the processing of the request to the database service 131 and removes the entry 122 from the queue. The worker 152 is then destroyed to free up resources for other operations in order to save costs.

In some embodiments, an algorithm specified in a request may comprise a classical or a quantum algorithm. A worker may determine if the classical algorithm or the quantum algorithm has to be translated into another classical algorithm or another quantum algorithm. Once a computational task in a request has been translated into quantum machine instructions, the quantum machine instructions may be transmitted to a quantum computer. The quantum computer may execute a classical algorithm or a quantum algorithm or both to complete a computational task.

Logging Unit

In some embodiments, the systems, media, networks, and methods described herein comprise a logging unit, or use of the same. In some embodiments, a logging service is in charge of tracking the events occurring in separate microservices. Some or all of the microservices may transmit a log of events into a central logging microservice.

An event disclosed herein may be associated with any one or more of the following: a login into the system, submitting a request, processing the request, queuing the request, processing a computational task in the request, dividing the computational task, translating the computational task into a quantum algorithm and quantum instructions, transmitting quantum instructions to a quantum computer, performing computations by a quantum computer, performing computational operations in a quantum computer, transmitting a computational result or a solution from a quantum computer to a server, and notifying a user of an availability of the results or solutions.

In some embodiments, a logging unit is programmed or configured to store a log, wherein the log comprises an event taking in the digital computer or the quantum processor. In some embodiments, a log comprises a timestamp of the event.

Figure 4:
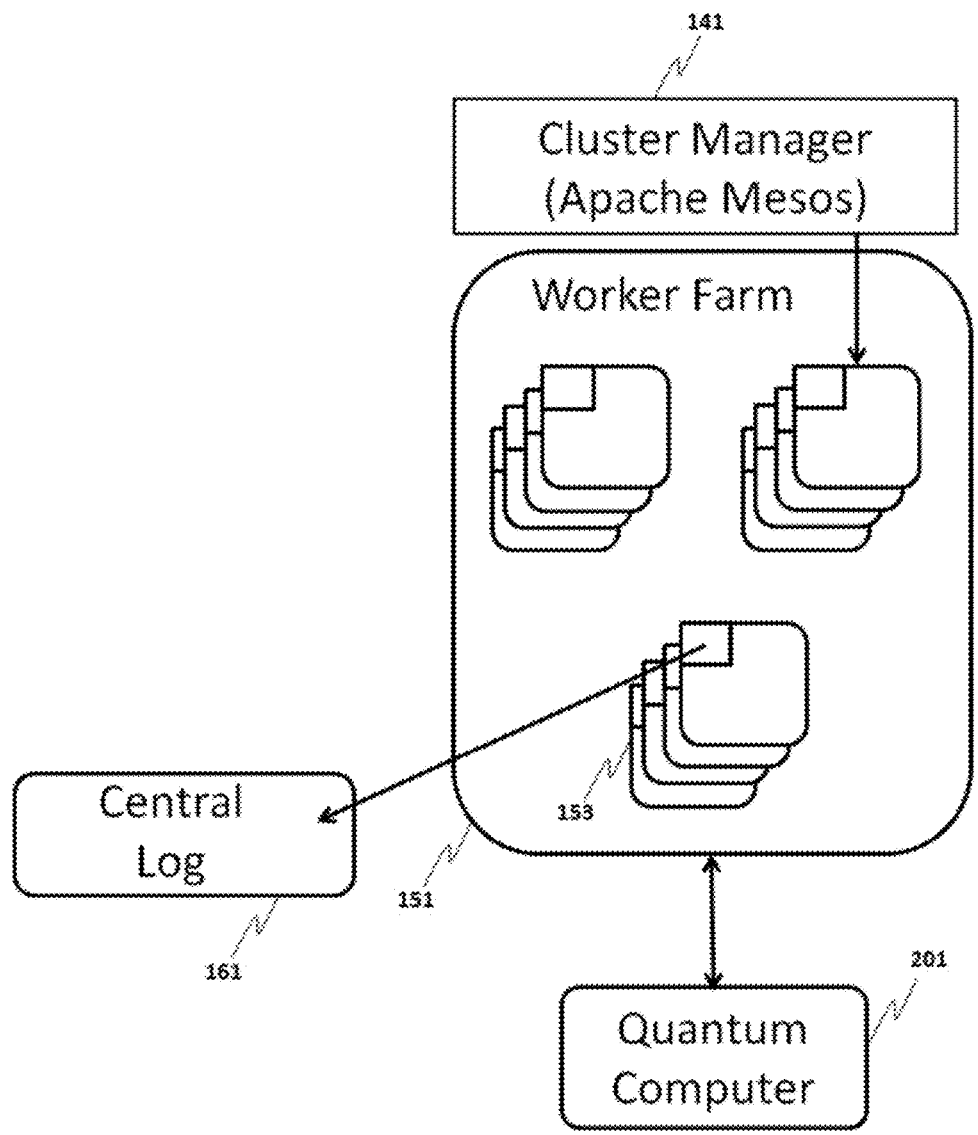
FIG. 4 shows a non-limiting example of a cluster manager and a logging unit.

Referring to FIG. 4, a logging unit 161 communicates with workers to record some or all of the events. In this figure, the logging unit 161 communicates with a worker 153 to record the start, the operations, and the end of computational tasks.

Quantum-Enabled and Quantum-Ready Computing

The present disclosure provides systems, media, networks, and methods that may include quantum-enabled computing or use of quantum-enabled computing. Quantum computers may be able to solve certain classes of computational tasks more efficiently than classical computers. However, quantum computation resources may be rare and expensive, and may involve a certain level of expertise to be used efficiently or effectively (e.g., cost-efficiently or cost-effectively). A number of parameters may be tuned in order for a quantum computer to deliver its potential computational power.

Quantum computers (or other types of non-classical computers) may be able to work alongside classical computers as co-processors. A hybrid architecture of quantum-enabled computation can be very efficient for addressing complex computational tasks, such as hard optimization problems. A system disclosed herein may provide a remote interface capable of solving computationally expensive problems by deciding if a problem may be solved efficiently on a quantum-ready or a classical computing service. The computing service behind the interface may be able to efficiently and intelligently decompose or break down the problem and delegate appropriate components of the computational task to a quantum-ready or a classical service.

The methods and systems described here may comprise an architecture configured to realize a cloud-based framework to provide hybrid quantum-enabled computing solutions to complex computational problems (such as complex discrete optimization) using a classical computer for some portion of the work and a quantum (or quantum-like) computer (e.g., quantum-ready or quantum-enabled) for the remaining portion of the work.

Figure 6:
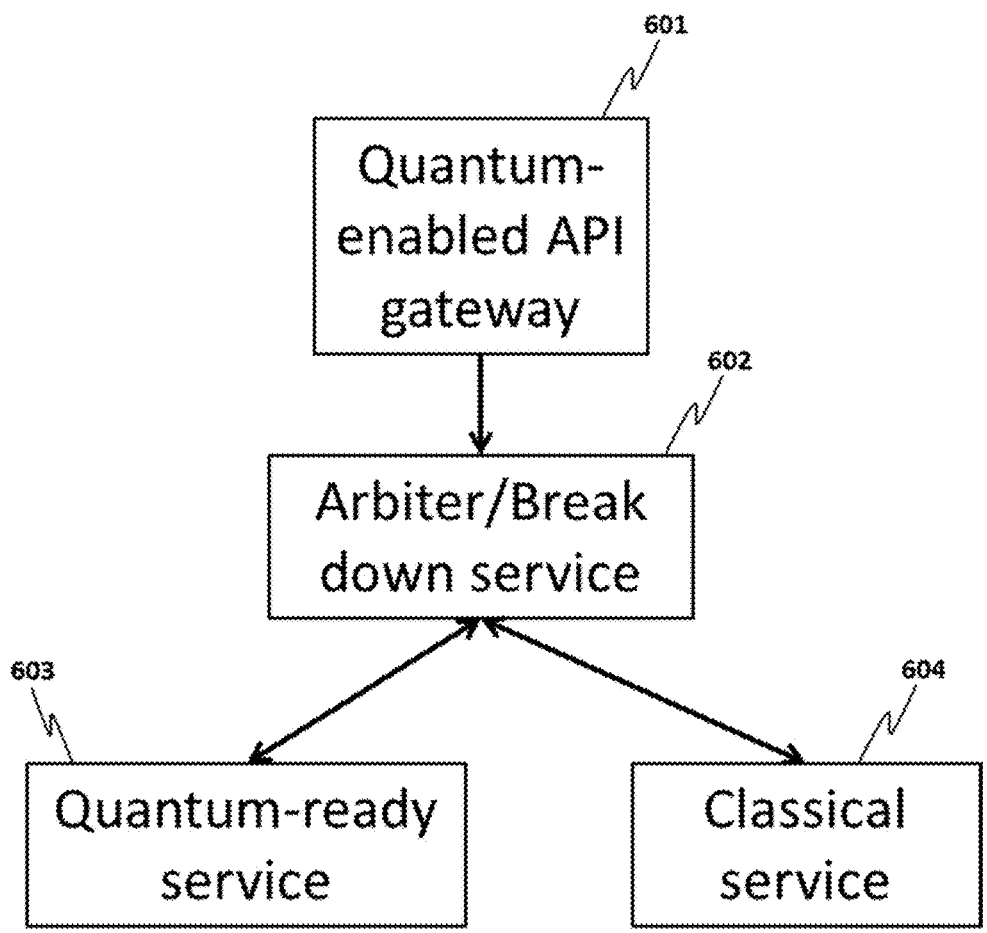
FIG. 6 shows a non-limiting example of a quantum-enabled computing platform.

FIG. 6 shows a workflow for performing a computational task using a quantum-ready (quantum ready) service. In a first operation, a user or a client may submit a computational task to an API gateway 601. The computational task may then be forwarded to an arbiter 602. In a second operation, the arbiter 602 may decompose and/or distribute the computational task to a quantum ready service 603 and a classical service 604. The computational task may thus be decomposed and/or distributed into sub-problems, each of which may be performed by a respective one of the quantum ready service 603 and the classical service 604. Next, one or more solutions from each of the quantum ready service 603 and the classical service 604 may be directed to the arbiter 602 (or another arbiter). Next, an indication of a solution to the computational task may be provided to the client or the user, such as being directed to a user interface of an electronic device of the client or the user (e.g., being directed over a network, such as over the cloud). The solution may comprise individual solutions to the sub-problems. The indication may include the solution or the individual solutions.

The technology disclosed herein may comprise a series of sub-processes that may involve intelligently decomposing a hard (e.g., complex) computational task into simpler (e.g., less complex) sub-problems. The system may further intelligently decide how to distribute the decomposed tasks between a plurality of classical computation resources and quantum-ready computation services.

Referring again to FIG. 6, the quantum-enabled API gateway 601 may comprise a user-facing service responsible for providing one or more of the following: Authentication, Monitoring (e.g., logging), and Bandwidth throttling. The user-facing service may comprise a programmatic access to a client computer. The authentication may check the identity of a user and determine if the access to the quantum-enabled resources should be granted.

Referring again to FIG. 6, the arbiter 602 may solve quantum problems and classical problems together. In some applications, the arbiter 602 may decompose a given problem using an intelligent algorithm. The arbiter 602 may comprise one or more intelligent algorithms operating in a centralized or distributed classical processing environment. The arbiter may provide a quantum-enabled software service by operating one or more of the following: (1) Breaking down (e.g., decomposing) a given problem into sub-problems; (2) Identifying the sub-problems that can be solved using a quantum-ready service 603; (3) Distributing tasks between the classical and quantum-ready services 603 and 604, respectively, accordingly; (4) Collecting solutions of the sub-problems from the classical and quantum-ready services 603 and 604, respectively; (5) Reducing the original computational tasks using the collected solutions to sub-problems; (6) If the original problem is completely solved, the system may provide an indication of the solution and terminate; otherwise, the system may repeat operation (1) for the remaining portion of the reduced problem. The operations of quantum-ready service 603 may be based on the technologies described elsewhere herein. On the other hand, classical service 604 may comprise any cloud-based software service configured to address processing of expensive computational tasks by obtaining an indication of such tasks from a client; applying required processes to transform the indication of such tasks to a proper form; and submitting the indication of such tasks to one or more classical digital computing devices, such as computers, clusters of computers, supercomputers, etc.

Figure 5:
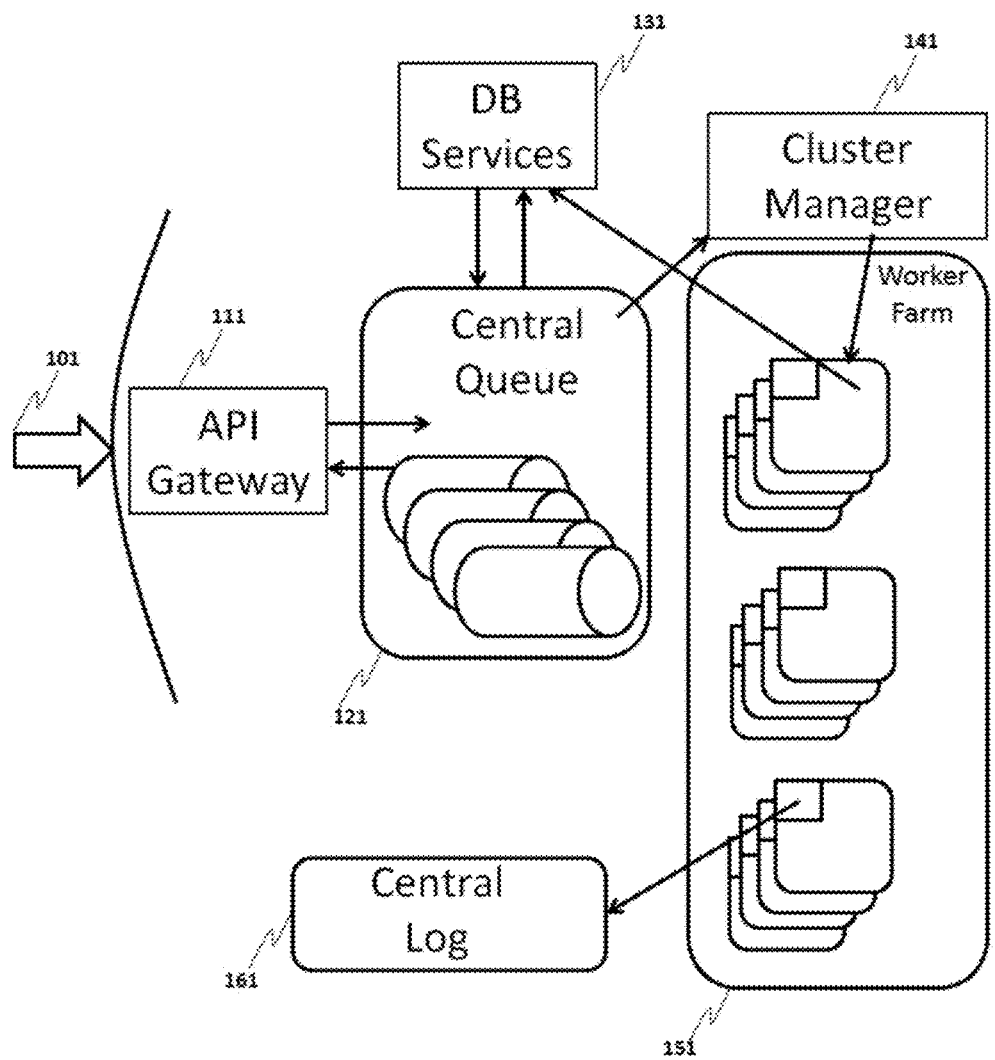
FIG. 5 shows a non-limiting example of a computing architecture of a cloud platform for accessing shared quantum computing resources.

In various implementations, a computing system may include parallel or distributed computing. The quantum-ready service 603 and classical service 604 may operate in parallel. Further, parallel computing may be implemented in the quantum-ready service 603. For example, referring to FIG. 5, a quantum computer may solve multiple computational problems in parallel in the worker farm 151; a single problem or sub-problem may be solved in parallel in the worker farm 151. Similarly, a classical computer may solve multiple computational problems in parallel; a single problem or sub-problem may be further solved in a parallel or distributed manner.

Figure 7:
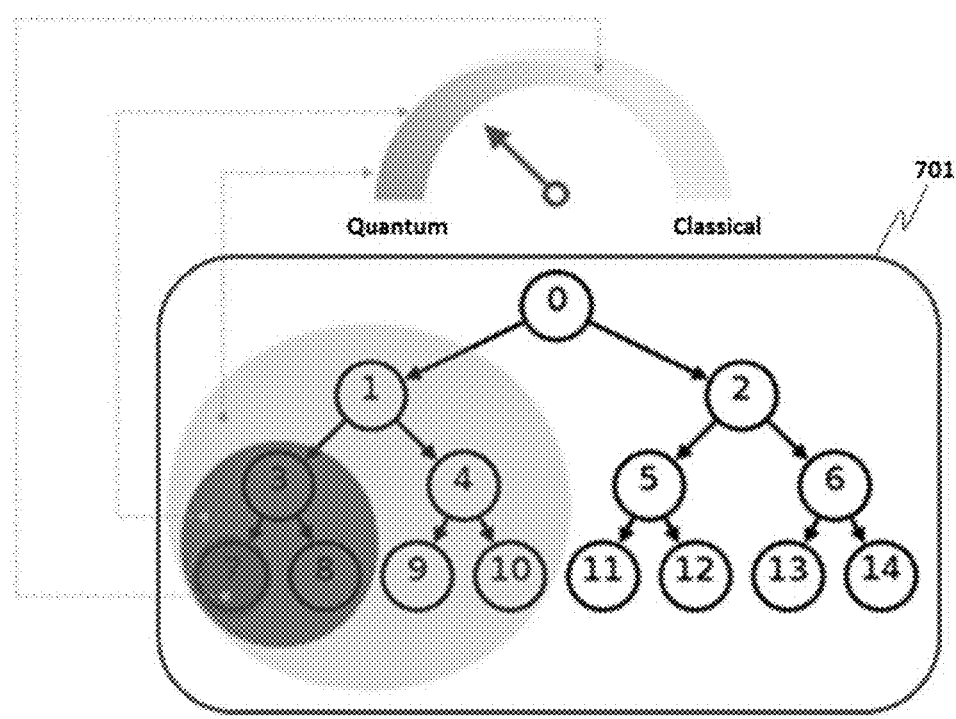
FIG. 7 shows a non-limiting example of an analysis tree for decomposing a given problem into sub-problems in quantum and classical computing resources.

Intelligent algorithms for decomposition and distribution may be dynamic and problem dependent. One or more such intelligent algorithms may be used. Referring to FIG. 7, intelligent algorithms may model a feasible solution space as a search tree 701. Each node of the tree may be used to decompose an original computing problem into corresponding sub-problems including disjoint or overlapping sets of variables. In tree 701, different nodes represent a sub-problem solver; for instance, nodes 0, 2, 5, 6, and 11-14 may be capable of solving classical tasks, while nodes 1, 3-4 and 7-10 may be capable of solving quantum tasks. Further, a capability of solving classical and quantum tasks may vary from node to node; for example, nodes 3 and 8 may be able to solve few classical tasks and many quantum tasks, while node 7 may be able to solve many classical tasks and few quantum tasks. The intelligent algorithms may compute certain characteristics of the potential sub-problems at a certain node in the search tree. Examples of characteristics may include, but are not limited to, adequacy in classical solvers, adequacy in quantum solvers, complexity (e.g., time and processor cycles) of computing tasks, current computing capacity in quantum and classical sources, and an estimated time of computed solutions. The characteristics may be deterministic or probabilistically modeled. The intelligent algorithms may have access to information about the size restrictions, capacity, and best-case performance modes of each of the available quantum and classical computing resources. The intelligent algorithms may use information available about the quantum and classical computing resources as well characteristics of potential sub-problems. The intelligent algorithms can determine whether it is advantageous to decompose the problem at a certain node of the search tree. If a decomposition takes place, the resulting sub-problems may be added to the pool of sub-problems together with their corresponding nodes in the search tree. If a decomposition is not advantageous, the intelligent algorithms may continue traversing the search tree considering all the possible nodes, until a certain decomposition is advantageous. Based on partial results of sub-problems received from the quantum or classical computing resources, the intelligent algorithms may be able to reduce the search tree by pruning certain nodes which may not contribute to a better solution.

Although the present disclosure has made reference to quantum computers, methods and systems of the present disclosure may be employed for use with other types of computers, which may be non-classical computers. Such non-classical computers may comprise quantum computers, hybrid quantum computers, quantum-type computers, or other computers that are not classical computers. Examples of non-classical computers may include, but are not limited to, Hitachi Ising solvers, coherent Ising machines based on optical parameters, and other solvers which utilize different physical phenomena to obtain more efficiency in solving particular classes of problems.

Transactions

In various embodiments, the systems, methods, platforms, and media described herein may comprise a transactional unit for receiving an item of value in exchange for at least executing the one or more instructions to generate the one or more solutions. The item of value may comprise money or credit. The item of value may be received from a user of the digital computer. The transactional unit may determine a cost for executing the one or more instructions to generate the one or more solutions. The transactional unit may determine the cost after or prior to executing the one or more instructions, and wherein the one or more instructions may be executed upon receiving authorization to execute the one or more instructions. The authorization may be received from a user of the digital computer. The item of value may be equal to the cost.

Methods and Systems for Generating Programming Problems

In another aspect, the present disclosure provides methods and systems for generating a programming problem. The programming problem may be solved using a non-classical computer of the present disclosure, such as, for example, a quantum computer.

The method disclosed herein can be applied to any quantum system of superconducting qubits, comprising local field biases on the qubits, and a plurality of couplings of the qubits, and control systems for applying and tuning local field biases and coupling strengths. Systems of quantum devices as such are disclosed for instance in US20120326720 and US20060225165.

Disclosed invention comprises a method for finding an integer encoding that uses the minimum number of binary variables in representation of an integer variable, while respecting an upper bound on the values of coefficients appearing in the encoding. Such an encoding is referred to as a "bounded-coefficient encoding". It also comprises a method for providing a system of constraints on the binary variables to prevent degeneracy of the bounded-coefficient encoding. Such a system of constraints involving the binary variables is referred to as "a system of non-degeneracy constraints".

Disclosed invention further comprises of employing bounded-coefficient encoding to represent a polynomial on a bounded integer domain as the Hamiltonian of a system of superconducting qubits.

An advantage of the method disclosed herein is that it enables an efficient method for finding the solution of a mixed integer polynomially constrained polynomial programming problem by finding the solution of an equivalent binary polynomially constrained polynomial programming. In one embodiment, the equivalent binary polynomially constrained polynomial programming problem might be solved by a system of superconducting qubits as disclosed in U.S. Ser. No. 15/051,271, U.S. Ser. No. 15/014,576, CA2921711 and CA2881033. Methods and systems for generating programming problems of the present disclosure may be as described in 2017/0344898 ("Methods and systems for setting a system of super conducting qubits having a Hamiltonian representative of a polynomial on a bounded integer domain", which is entirely incorporated herein by reference.

Described herein is a method for setting a system of superconducting qubits having a Hamiltonian representative of a polynomial on a bounded integer domain via bounded-coefficient encoding, the method comprising: using one or more computer processors to obtaining (i) the polynomial on the bounded integer domain and (ii) integer encoding parameters; computing the bounded-coefficient encoding using the integer encoding parameters; recasting each integer variable as a linear function of binary variables using the bounded-coefficient encoding, and providing additional constraints on the attained binary variables to avoid degeneracy in the encoding, if required by a user; substituting each integer variable with an equivalent binary representation, and computing the coefficients of the equivalent binary representation of the polynomial on the bounded integer domain; performing a degree reduction on the obtained equivalent binary representation of the polynomial on the bounded integer domain to provide an equivalent polynomial of degree at most two in binary variables; and setting local field biases and coupling strengths on the system of superconducting qubits using the coefficients of the derived polynomial of degree at most two in several binary variables.

Also described herein, in certain embodiments, is a system comprising: a sub-system of superconducting qubits; a computer operatively coupled to the sub-system of superconducting qubits, wherein the computer comprises at least one computer processor, an operating system configured to perform executable instructions, and a memory; and a computer program including instructions executable by the at least one computer processor to generate an application for setting the sub-system of superconducting qubits having a Hamiltonian representative of a polynomial on a bounded integer domain via bounded-coefficient encoding, the application comprising: a first module programmed or otherwise configured to obtain the polynomial on the bounded integer domain; a second module programmed or otherwise configured to obtain integer encoding parameters; a third module programmed or otherwise configured to compute a bounded-coefficient encoding using the integer encoding parameters; a fourth module programmed or otherwise configured to recast each integer variable as a linear function of binary variables using the bounded-coefficient encoding and provide additional constraints on the attained binary variables to avoid degeneracy in the encoding, if required by a user; a fifth module programmed or otherwise configured to substitute each integer variable with an equivalent binary representation, and compute the coefficients of the equivalent binary representation of the polynomial on the bounded integer domain; a software module programmed or otherwise configured to reduce a polynomial in several binary variables to a polynomial of degree at most two in several binary variables; a software module programmed or otherwise configured to provide an assignment of binary variables of the obtained equivalent binary polynomial of degree at most two to qubits; and a software module programmed or otherwise configured to set local field biases and coupling strengths on the system of superconducting qubits using the coefficients of the derived polynomial of degree at most two in several binary variables.

Also described herein, in certain embodiments, is a non-transitory computer-readable medium comprising machine-executable code that, upon execution by one or more computer processors, implements a method for setting a system of superconducting qubits having a Hamiltonian representative of a polynomial on a bounded integer domain via bounded-coefficient encoding, the method comprising: using one or more computer processors to obtain (i) the polynomial on the bounded integer domain and (ii) integer encoding parameters; computing the bounded-coefficient encoding using the integer encoding parameters; recasting each integer variable as a linear function of binary variables using the bounded-coefficient encoding, and providing additional constraints on the attained binary variables to avoid degeneracy in the encoding, if required by a user; substituting each integer variable with an equivalent binary representation, and computing the coefficients of the equivalent binary representation of the polynomial on the bounded integer domain; performing a degree reduction on the obtained equivalent binary representation of the polynomial on the bounded integer domain to provide an equivalent polynomial of degree at most two in binary variables; and setting local field biases and coupling strengths on the system of superconducting qubits using the coefficients of the derived polynomial of degree at most two in several binary variables.

Various Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

The term "integer variable" and like terms refer to a data structure for storing integers in a digital system, between two integers l and u where $l \leq u$. The integer l is called the "lower bound" and the integer u is called the "upper bound" of the integer variable x.

It is appreciated by the skilled addressee that every integer variable $\bar{x}$ with lower and upper bounds l and u respectively, can be transformed to a bounded integer variable x with lower and upper bounds 0 and u−l respectively.

Accordingly, herein the term "bounded integer variable" refers to an integer variable which may represent integer values with lower bound equal to 0. One may denote a bounded integer variable x with upper bound u by $x \in \{0, 1, \ldots, u\}$.

The term "binary variable" and like terms refer to a data structure for storing integers 0 and 1 in a digital system. It is appreciated that in some embodiments computer bits are used to store such binary variables.

The term "integer encoding" of a bounded integer variable x refers to a tuple $(c_1, \ldots, c_d)$ of integers such that the identity $\bar{x} = \Sigma_{i=1}^{d} c_i \bar{y}_i$ is satisfied for every possible value $\bar{x}$ of x using a choice of binary numbers $\bar{y}_1, \ldots, \bar{y}_d$ for binary variables $y_1, \ldots, y_d$.

The term "bounded-coefficient encoding" with bound M, refers to an integer encoding $(c_1, \ldots, c_d)$ of a bounded integer variable x such that $c_i \leq M$ for all $i=1, \ldots, d$, and uses the least number of binary variables $y_1, \ldots, y_d$ amongst all encodings of x satisfying these inequalities.

The term "a system of non-degeneracy constraints" refers to a system of constraints that makes the equation $\bar{x} = \Sigma_{i=1}^{d} c_i \bar{y}_i$ have a unique binary solution $(\bar{y}_1, \ldots, \bar{y}_d)$ for every choice of value $\bar{x}$ for variable x.

The term "polynomial on a bounded integer domain" and like terms mean a function of the form $$f(x) = \sum_{t=1}^{T} Q_t \prod_{i=1}^{n} x_i^{p_i^t},$$

in several integer variables $x_i \in \{0, 1, 2, \ldots, \kappa_i\}$ for $i=1, \ldots, n$, where $p_i^t \geq 0$ is an integer denoting the power of variable $x_i$ in t-th term and $\kappa_i$ is the upper bound of $x_i$.

The term "polynomial of degree at most two on bounded integer domain" and like terms mean a function of the form $$f(x) = \sum_{i,j=1}^{n} Q_{ij} x_i x_j + \sum_{i=1}^{n} q_i x_i$$

in several integer variables $x_i \in \{0, 1, 2, \ldots, \kappa_i\}$ for $i=1, \ldots, n$, where $\kappa_i$ is the upper bound of $x_i$.

It is appreciated that a polynomial of degree at most two on binary domain, can be represented by a vector of linear coefficients $(q_1, \ldots, q_n)$ and an $n \times n$ symmetric matrix $Q=(Q_{ij})$ with zero diagonal.

The term "mixed-integer polynomially constrained polynomial programming" problem and like terms mean finding the minimum of a polynomial $y=f(x)$ in several variables $x=(x_1, \ldots, x_n)$, that a nonempty subset of them indexed by $S \subseteq \{1, \ldots, n\}$ are bounded integer variables and the rest are binary variables, subject to a (possibly empty) family of equality constraints determined by a (possibly empty) family of e equations $g_j(x)=0$ for $j=1, \ldots, e$ and a (possibly empty) family of inequality constraints determined by a (possibly empty) family of l inequalities $h_j(x) \leq 0$ for $j=1, \ldots, l$. Here, all functions $f(x)$, $g_i(x)$ for $i=1, \ldots, e$ and $h_j(x)$ for $j=1, \ldots, l$ are polynomials. It is appreciated that a mixed integer polynomially constrained polynomial programming problem can be represented as:

$$\min f(x)$$

$$\text{subject to } g_i(x)=0 \ \forall i \in \{1, \ldots, e\},$$

$$h_j(x) \leq 0 \ \forall j \in \{1, \ldots, l\},$$

$$x_s \in \{0, \ldots, \kappa_s\} \ \forall s \in S \subseteq \{1, \ldots, n\},$$

$$x_s \in \{0,1\} \ \forall s \notin S.$$

The above mixed integer polynomially constrained polynomial programming problem will be denoted by $(P_I)$ and the optimal value of it will be denoted by $v(P_I)$. An optimal solution, denoted by $x^*$, is a vector at which the objective function attains the value $v(P_I)$ and all constraints are satisfied.

The term "polynomial of degree at most two on binary domain" and like terms mean a function of form $f(x) = \Sigma_{i,j=1}^{n} Q_{ij} x_i x_j + \Sigma_{i=1}^{n} q_i x_i$ defined on several binary variables $x_i \in \{0,1\}$ for $i=1, \ldots, n$.

It is appreciated that a polynomial of degree at most two on binary domain, can be represented by a vector of linear coefficients $(q_1, \ldots, q_n)$ and a $n \times n$ symmetric matrix $Q=(Q_{ij})$ with zero diagonal.

The term "binary polynomially constrained polynomial programming" problem and like terms mean a mixed-integer polynomially constrained polynomial programming $P_I$ such that $S=\emptyset$:

$$\min f(x)$$

$$\text{subject to } g_i(x)=0 \ \forall i \in \{1 \ldots, e\}$$

$$h_j(x) \leq 0 \ \forall j \in \{1, \ldots l\}$$

$$x_k \in \{0,1\} \ \forall k \in \{1, \ldots n\}.$$

The above binary polynomially constrained polynomial programming problem is denoted by $P_B$ and its optimal value is denoted by $v(P_B)$.

Two mathematical programming problems are called "equivalent" if having the optimal solution of each one of them, the optimal solution of the other one can be computed in polynomial time of the size of former optimal solution.

The term "qubit" and like terms generally refer to any physical implementation of a quantum mechanical system represented on a Hilbert space and realizing at least two distinct and distinguishable eigenstates representative of the two states of a quantum bit. A quantum bit is the analogue of the digital bits, where the ambient storing device may store two states $|0\rangle$ and $|1\rangle$ of a two-state quantum information, but also in superpositions $$\alpha|0\rangle + \beta|1\rangle$$

of the two states. In various embodiments, such systems may have more than two eigenstates in which case the additional eigenstates are used to represent the two logical states by degenerate measurements. Various embodiments of implementations of qubits have been proposed; e.g. solid state nuclear spins, measured and controlled electronically or with nuclear magnetic resonance, trapped ions, atoms in optical cavities (cavity quantum-electrodynamics), liquid state nuclear spins, electronic charge or spin degrees of freedom in quantum dots, superconducting quantum circuits based on Josephson junctions (Barone and Paternò, 1982, "Physics and Applications of the Josephson Effect," John Wiley and Sons, New York; Martinis et al., 2002, Physical Review *Letters* 89, 117901) and electrons on Helium.

The term "local field", refers to a source of bias inductively coupled to a qubit. In one embodiment a bias source is an electromagnetic device used to thread a magnetic flux through the qubit to provide control of the state of the qubit (U.S. Patent Publication No. 20060225165].

The term "local field bias" and like terms refer to a linear bias on the energies of the two states $|0\rangle$ and $|1\rangle$ of the qubit. In one embodiment the local field bias is enforced by changing the strength of a local field in proximity of the qubit (U.S. Patent Publication No. US2006/0225165).

The term "coupling" of two qubits $H_1$ and $H_2$ is a device in proximity of both qubits threading a magnetic flux to both qubits. In one embodiment, a coupling may consist of a superconducting circuit interrupted by a compound Josephson junction. A magnetic flux may thread the compound Josephson junction and consequently thread a magnetic flux on both qubits (U.S. Patent Publication No. 2006/0225165).

The term "coupling strength" between qubits $H_1$ and $H_2$ refer to a quadratic bias on the energies of the quantum system comprising both qubits. In one embodiment the coupling strength is enforced by tuning the coupling device in proximity of both qubits.

The term "quantum device control system", refers to a system comprising a digital processing unit capable of initiating and tuning the local field biases and couplings strengths of a quantum system.

The term "system of superconducting qubits" and like, refers to a quantum mechanical system comprising a plurality of qubits and plurality of couplings between a plurality of pairs of the plurality of qubits, and further comprising a quantum device control system.

It is appreciated that a system of superconducting qubits may be manufacture in various embodiments. In one embodiment a system of superconducting qubits is a "quantum annealer".

The term "quantum annealer" and like terms mean a system of superconducting qubits that carries optimization of a configuration of spins in an Ising spin model using quantum annealing as described, for example, in Farhi, E. et al., "Quantum Adiabatic Evolution Algorithms versus Simulated Annealing" arXiv.org: quant ph/0201031 (2002), pp. 1-16. An embodiment of such an analog processor is disclosed by McGeoch, Catherine C. and Cong Wang, (2013), "Experimental Evaluation of an Adiabatic Quantum System for Combinatorial Optimization" Computing Frontiers," May 14-16, 2013 (http://www.cs.amherst.edu/ccm/cf14-mcgeoch.pdf) and also disclosed in the U.S. Patent Application No. US 2006/0225165.

Steps and Architecture for Setting a System of Superconducting Qubits

In some embodiments, the methods, systems, and media described herein include a series of steps for setting a system of superconducting qubits having a Hamiltonian representative of a polynomial on a bounded integer domain via bounded-coefficient encoding. In some embodiments, the method disclosed herein can be used in conjunction with any method on any solver for solving a binary polynomially constrained polynomial programming problem to solve a mixed-integer polynomially constrained polynomial programming problem.

Figure 8:
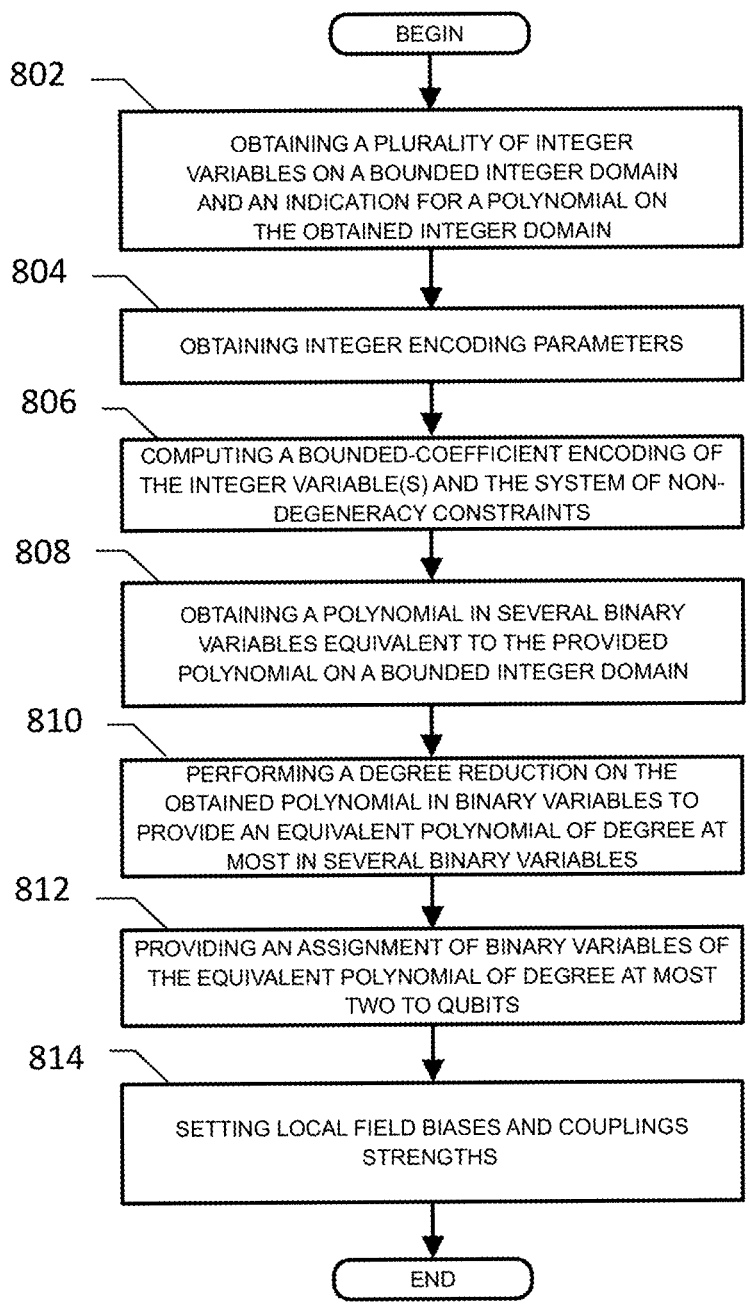
FIG. 8 shows a non-limiting example of a method for setting a system of superconducting qubits having a Hamiltonian representative of a polynomial on a bounded integer domain; in this case, a flowchart of all steps used for setting a system of superconducting qubits in such a way.

Referring to FIG. 8, in a particular embodiment, a flowchart of all steps is presented as for setting a system of superconducting qubits having a Hamiltonian representative of a polynomial on a bounded integer domain. Specifically, processing step 802 is shown to be obtaining a plurality of integer variables on a bounded integer domain and an indication for a polynomial in those variables. Processing step 804 is disclosed as for obtaining integer encoding parameters. Processing step 806 is used to be computing a bounded-coefficient encoding of the integer variable(s) and the system of non-degeneracy constraints. Processing step 808 is displayed to be obtaining a polynomial in several binary variables equivalent to the provided polynomial on a bounded integer domain. Processing step 810 is shown to be performing a degree reduction on the obtained polynomial in several binary variables to provide a polynomial of degree at most two in several binary variables. Processing step 812 is shown to be providing an assignment of binary variables of the equivalent polynomial of degree at most two to qubits. Processing step 812 is used to be setting local field biases and couplings strengths.

Figure 9:
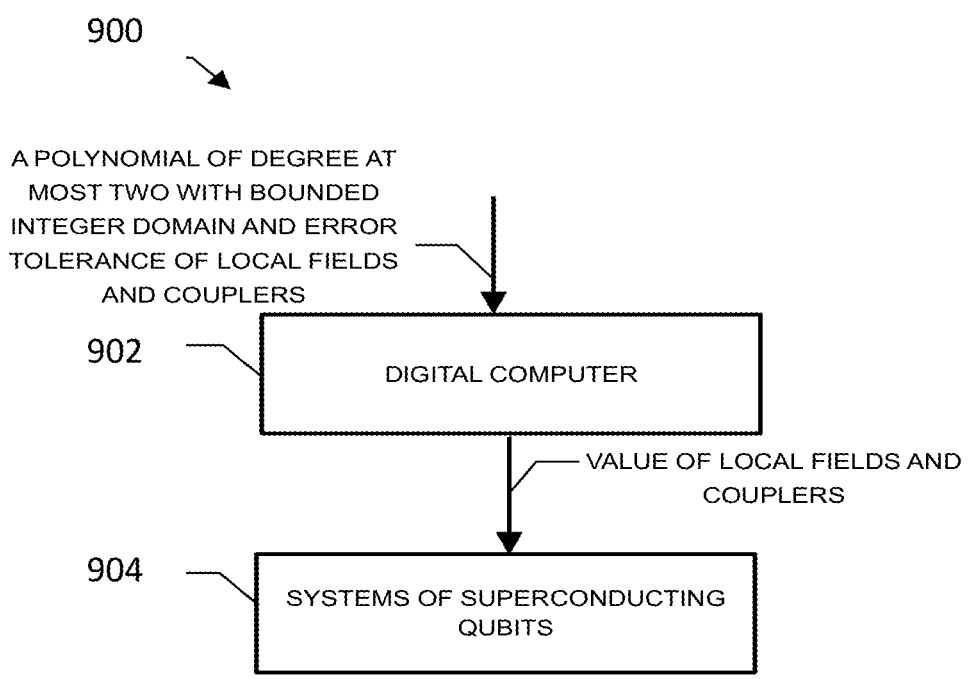
FIG. 9 shows a non-limiting example of a method for setting a system of superconducting qubits having a Hamiltonian representative of a polynomial on a bounded integer domain; in this case, a diagram of a system comprising of a digital computer interacting with a system of superconducting qubits.

Referring to FIG. 9, in a particular embodiment, a diagram of a system for setting a system of superconducting qubits having a Hamiltonian representative of a polynomial on a bounded integer domain is demonstrated to be comprising of a digital computer interacting with a system of superconducting qubits.

Specially, there is shown an embodiment of a system 900 in which an embodiment of the method for setting a system of superconducting qubits in such a way that its Hamiltonian is representative of a polynomial on a bounded integer domain may be implemented. The system 900 comprises a digital computer 902 and a system 904 of superconducting qubits. The digital computer 902 receives a polynomial on a bounded integer domain and the encoding parameters and provides the bounded-coefficient encoding, a system of non-degeneracy constraints, and the values of local fields and couplers for the system of superconducting qubits.

It will be appreciated that the polynomial on a bounded integer domain may be provided according to various embodiments. In one embodiment, the polynomial on a bounded integer domain is provided by a user interacting with the digital computer 902. Alternatively, the polynomial on a bounded integer domain is provided by another computer, not shown, operatively connected to the digital computer 902. Alternatively, the polynomial on a bounded integer domain is provided by an independent software package. Alternatively, the polynomial on a bounded integer domain is provided by an intelligent agent.

It will be appreciated that the integer encoding parameters may be provided according to various embodiments. In one embodiment, the integer encoding parameters are provided by a user interacting with the digital computer 202. Alternatively, the integer encoding parameters are provided by another computer, not shown, operatively connected to the digital computer 902. Alternatively, the integer encoding parameters are provided by an independent software package. Alternatively, the integer encoding parameters are provided by an intelligent agent.

In some embodiments, the skilled addressee appreciates that the digital computer 202 may be any type. In one embodiment, the digital computer 202 is selected from a group consisting of desktop computers, laptop computers, tablet PCs, servers, smartphones, etc.

Figure 10:
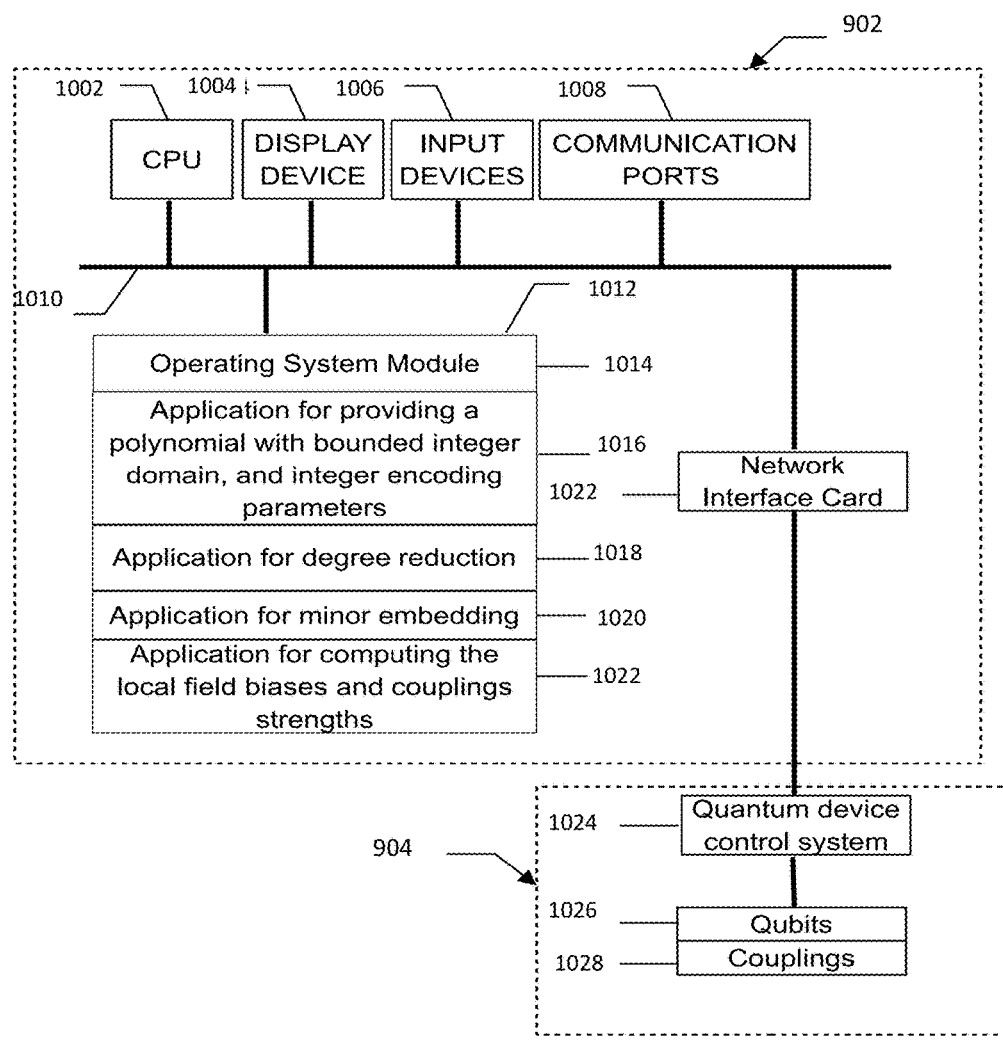
FIG. 10 shows a non-limiting example of a method for setting a system of superconducting qubits having a Hamiltonian representative of a polynomial on a bounded integer domain; in this case, a detailed diagram of a system comprising of a digital computer interacting with a system of superconducting qubits used for computing the local fields and couplers.

Referring to FIG. 10, in a particular embodiment, a diagram of a system for setting a system of superconducting qubits having a Hamiltonian representative of a polynomial on a bounded integer domain is demonstrated to be comprising of a digital computer used for computing the local fields and couplers.

Further referring to FIG. 10, there is shown an embodiment of a digital computer 902 interacting with a system 904 of superconducting qubits. It will be appreciated that the digital computer 902 may also be broadly referred to as a processor. In this embodiment, the digital computer 902 comprises a central processing unit (CPU) 1002, also referred to as a microprocessor, a display device 1004, input devices 1006, communication ports 1008, a data bus 1010, a memory unit 1012 and a network interface card (NIC) 1022.

The CPU 1002 is used for processing computer instructions. It's appreciated that various embodiments of the CPU 1002 may be provided. In one embodiment, the central processing unit 1002 is a CPU Core i7-3820 running at 3.6 GHz and manufactured by Intel™.

The display device 1004 is used for displaying data to a user. The skilled addressee will appreciate that various types of display device 1004 may be used. In one embodiment, the display device 1004 is a standard liquid-crystal display (LCD) monitor.

The communication ports 1008 are used for sharing data with the digital computer 902. The communication ports 1008 may comprise, for instance, a universal serial bus (USB) port for connecting a keyboard and a mouse to the digital computer 902. The communication ports 1008 may further comprise a data network communication port such as an IEEE 802.3 port for enabling a connection of the digital computer 902 with another computer via a data network. The skilled addressee will appreciate that various alternative embodiments of the communication ports 1008 may be provided. In one embodiment, the communication ports 308 comprise an Ethernet port and a mouse port (e.g., Logitech™).

The memory unit 1012 is used for storing computer-executable instructions. It will be appreciated that the memory unit 1012 comprises, in one embodiment, an operating system module 1014. It will be appreciated by the skilled addressee that the operating system module 1014 may be of various types. In an embodiment, the operating system module 1014 is OS X Yosemite manufactured by Apple™.

The memory unit 1012 further comprises an application for providing a polynomial on a bounded integer domain, and integer encoding parameters 1016. The memory unit 1012 further comprises an application for reducing the degree of a polynomial in several binary variables to at most two 1018. It is appreciated that the application for reducing the degree of a polynomial in several binary variables can be of various kinds. One embodiment of an application for reducing degree of a polynomial in several binary variables to at most two is disclosed by H. Ishikawa, "Transformation of General Binary MRF Minimization to the First-Order Case," in IEEE Transactions on Pattern Analysis and Machine Intelligence, vol. 33, no. 6, pp. 1234-1249, June 2011 and by Martin Anthony, Endre Boros, Yves Crama, and Aritanan Gruber. 2016. Quadratization of symmetric pseudo-Boolean functions. Discrete Appl. Math. 203, C (April 2016), 1-12. (DOI=http://dx.doi.org/10.1016/j.dam.2016.01.001). The memory unit 1012 further comprises an application for minor embedding of a source graph to a target graph 1020. It is appreciated that the application for minor embedding can be of various kinds. One embodiment of an application for minor embedding of a source graph to a target graph is disclosed in U.S. Pat. No. 8,244,662. The memory unit 1012 further comprises an application for computing the local field biases and couplings strengths.

Each of the central processing unit 1002, the display device 1004, the input devices 1006, the communication ports 1008 and the memory unit 1012 is interconnected via the data bus 1010.

The system 902 further comprises a network interface card (NIC) 1022. The application 1020 sends the appropriate signals along the data bus 1010 into NIC 1022. NIC 1022, in turn, sends such information to quantum device control system 1024.

The system 904 of superconducting qubits comprises a plurality of superconducting quantum bits and a plurality of coupling devices. Further description of such a system is disclosed in U.S. Patent Application No. 2006/0225165.

The system 904 of superconducting qubits, further comprises a quantum device control system 1024. The control system 1024 itself comprises coupling controller for each coupling in the plurality 328 of couplings of the device 204 capable of tuning the coupling strengths of a corresponding coupling, and local field bias controller for each qubit in the plurality 1026 of qubits of the device 904 capable of setting a local field bias on each qubit.

Obtaining a Plurality of Integer Variables on a Bounded Integer Domain

In some embodiments, the methods, systems, and media described herein include a series of steps for setting a system of superconducting qubits having a Hamiltonian representative of a polynomial on a bounded integer domain via bounded-coefficient encoding. In some embodiments, a processing step is shown to be obtaining a plurality of integer variables on a bounded integer domain and an indication for a polynomial in those variables.

Figure 11:
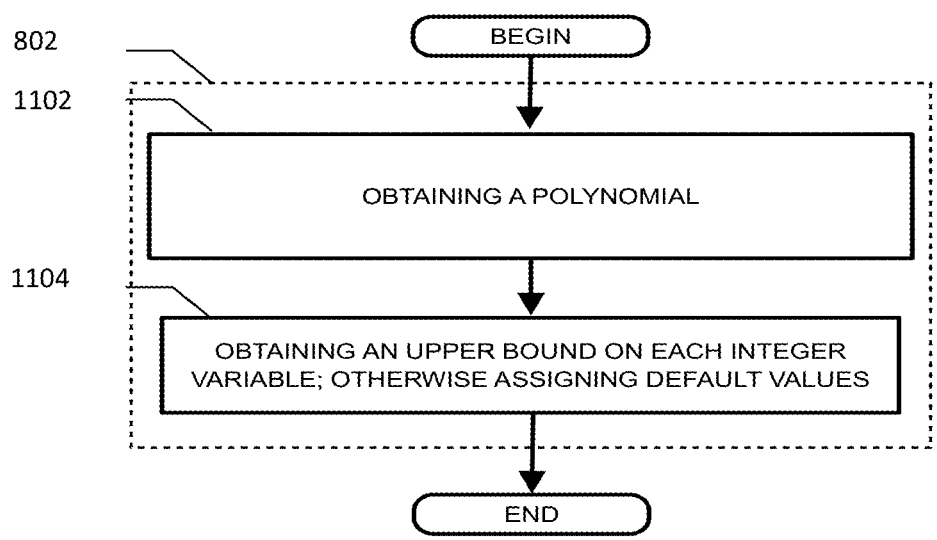
FIG. 11 shows a non-limiting example of a method for setting a system of superconducting qubits having a Hamiltonian representative of a polynomial on a bounded integer domain; in this case, a flowchart of a step for providing a polynomial on a bounded integer domain.

Referring to FIG. 8 and according to processing step 802, a polynomial on a bounded integer domain is obtained. Referring to FIG. 11, in a particular embodiment, there is shown of a detailed processing step for providing a polynomial on a bounded integer domain.

According to processing step 1102, the coefficient of each term of a polynomial and the degree of each variable in the corresponding term are provided. It is appreciated that providing the coefficient and degree of each variable in each term can be performed in various embodiments. In one embodiments a list of form $[Q_t, p_1^t, p_2^t, \ldots p_n^t]$ is provided for each term of the polynomial in which $Q_t$ is the coefficient of the t-th term and $p_i^t$ is the power of i-th variable in the t-th term.

In another embodiment, and in the particular case that the provided polynomial is of degree at most two a list $(q_1, \ldots, q_n)$ and a n×n symmetric matrix $Q=(Q_{ij})$ is provided. It is appreciated that a single bounded integer variable is an embodiment of a polynomial of degree at most two in which n=1, $q_1=1$ and $Q=(Q_{11})=(0)$.

It the same embodiment, it is also appreciated that if $Q_{ij}=0$ for all i,j=1, . . . , n, the provided polynomial is a linear function.

It will be appreciated that the providing of a polynomial may be performed according to various embodiments.

As mentioned above and in one embodiment, the coefficients of a polynomial are provided by a user interacting with the digital computer 902. Alternatively, the coefficients of a polynomial are provided by another computer operatively connected to the digital computer 902. Alternatively, the coefficients of a polynomial are provided by an independent software package. Alternatively, an intelligent agent provides the coefficients of a polynomial.

According to processing step 1104, an upper bound on each bounded integer variable is provided. It will be appreciated that the providing of upper bounds on the bounded integer variables may be performed according to various embodiments.

As mentioned above and in one embodiment, the upper bounds on the integer variables are provided by a user interacting with the digital computer 902. Alternatively, the upper bounds on the integer variables are provided by another computer operatively connected to the digital computer 902. Alternatively, the upper bounds on the integer variables are provided by an independent software package or a computer readable and executable subroutine. Alternatively, an intelligent agent provides the upper bounds on the integer variables.

Obtaining Integer Encoding Parameters

In some embodiments, the methods, systems, and media described herein include a series of steps for setting a system of superconducting qubits having a Hamiltonian representative of a polynomial on a bounded integer domain via bounded-coefficient encoding. In some embodiments, a processing step is shown to be obtaining integer encoding parameters. Referring to FIG. 8 and processing step 804, the integer encoding parameters are obtained.

It is appreciated that the integer encoding parameters comprises of either obtaining an upper bound on the coefficients $c_i$'s of the bounded-coefficient encoding directly; or obtaining the error tolerances $\in_l$ and $\in_c$ of the local field biases and couplings strengths, respectively. If the upper bound on the coefficients $c_i$'s is not provided directly, it is computed by the digital computer 902 as described in the processing step 1204.

Figure 12:
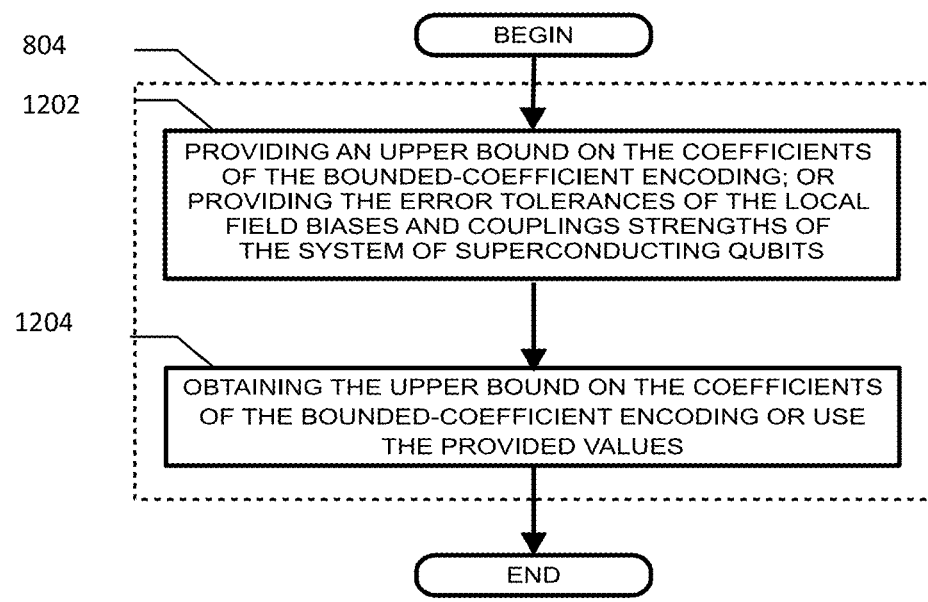
FIG. 12 shows a non-limiting example of a method for setting a system of superconducting qubits having a Hamiltonian representative of a polynomial on a bounded integer domain; in this case, a flowchart of a step for providing encoding parameters.

Referring to FIG. 12 and according to processing step 1202, an upper bound on the coefficients of the bounded-coefficient encoding may be provided. It will be appreciated that the providing of the upper bound on the coefficients of the bounded-coefficient encoding may be performed according to various embodiments. In one embodiment, the upper bound on the coefficients of the bounded-coefficient encoding is provided directly by a user, a computer, a software package or an intelligent agent.

Still referring to processing step 1202, if the upper bound on the coefficients of the bounded-coefficient encoding is not directly provided, the error tolerances of the local field biases and the couplings strengths of the system of superconducting qubits are provided. It will be appreciated that the providing of the error tolerances of the local field biases and the couplings strengths of the system of superconducting qubits may be performed according to various embodiments. In one embodiment, the error tolerances of the local field biases and the couplings strengths of the system of superconducting qubits are provided directly by user, a computer, a software package or an intelligent agent.

According to processing steps 1204, the upper bound on the coefficients of the bounded-coefficient encoding is obtained based on the error tolerances $\in_l$ and $\in_c$ respectively of the local field biases and couplings strengths of the system of superconducting qubits.

Still referring to processing step 1204 the upper bound of the values of the coefficients of the integer encoding is obtained. The description of the system used for computing the upper bound of the coefficients of the bounded-coefficient encoding when $\in_l$ and $\in_c$ are provided, is now presented in detail.

If the provided polynomial is only a single bounded integer variable x, then the upper bound on the coefficients of the bounded-coefficient encoding of x denoted by $\mu^x$ is computed and stored as $$\mu^x = \left\lfloor \frac{1}{\epsilon_\ell} \right\rfloor.$$

If the provided polynomial is of degree one, i.e. $f(x) = \sum_{i=1}^{n} q_i x_i$, then the upper bound of the coefficients of the bounded-coefficient encoding for variable $x_i$ is computed and stored as $$\mu^{x_i} = \left\lfloor \frac{\min_j \{|q_j|\}}{|q_i|\epsilon_\ell} \right\rfloor.$$

It is appreciated that if $\mu^{x_i}$ for $i=1, \ldots, n$ are required to be of equal value, the upper bound of the coefficients of the bounded-coefficient encoding is stored as $$\mu = \left\lfloor \frac{\min_j \{|q_j|\}}{\max_j \{|q_i|\}\epsilon_\ell} \right\rfloor.$$

It is appreciated that this value of $\mu$ coincides with $\min_j \{\mu^{x_j}\}$.

If the provided polynomial is of degree at least two, i.e., $f(x) = \sum_{t=1}^{T} Q_t \prod_{i=1}^{n} x_i^{p_i^t}$, and there exists a t such that $\sum_{i=1}^{n} p_i^t \geq 2$, the upper bounds on the coefficients of the bounded-coefficient encodings for variables $x_i$ for $i=1, \ldots, n$ must be such that the coefficient of the equivalent polynomial of degree at most two in several variables derived after the substitution of binary representation of $x_i$'s and performing the degree reduction, i.e., $$f(x) = \sum_{i=1}^{\bar{n}} q_i^B y_i + \sum_{\substack{i,j=1 \\ i \neq j}}^{\bar{n}} Q_{ij}^B y_i y_j$$

satisfy the following inequalities:

$$\frac{\min_i |q_i^B|}{\max_i |q_i^B|} \geq \epsilon_\ell,$$

and $$\frac{\min_i |Q_{ij}^B|}{\max_i |Q_{ij}^B|} \geq \epsilon_c.$$

It is appreciated that finding the upper bounds on the coefficients of the bounded-coefficient encoding such that the above inequalities are satisfied can be done in various embodiments. In one embodiment, a variant of a bisection search may be employed to find the upper bounds on the coefficients of the bounded-coefficient encoding such that the above inequalities are satisfied. In another embodiment a suitable heuristic search utilizing the coefficients and degree of the polynomial may be employed to find the upper bounds on the coefficients of the bounded-coefficient encoding such that the above inequalities are satisfied.

In a particular case that $f(x) = \sum_{i=1}^{n} q_i x_i + \sum_{i,j=1}^{n} Q_{ij} x_i x_j$, and $Q_{ii}$ and $q_i$ are of the same sign, the above set of inequalities are reduced to $$|Q_{ii}|(\mu^{x_i})^2 + |q_i|\mu^{x_i} \leq \frac{m_\ell}{\epsilon_\ell} \text{ for } i = 1, \ldots, n,$$

$$\mu^{x_i} \leq \sqrt{\frac{m_c}{|Q_{ii}|\epsilon_c}} \text{ for } i = 1, \ldots, n: Q_{ii} \neq 0,$$

$$\mu^{x_i}\mu^{x_j} \leq \frac{m_c}{|Q_{ij}|\epsilon_c} \text{ for } i, j = 1, \ldots, n: Q_{ij} \neq 0,$$

for $m_\ell = \min_i \{|Q_{ii} + q_i|\}$ and $m_c = \min_{i,j} \{|Q_{ii}|, |Q_{ij}|\}$. Various methods may be employed to find $\mu^{x_i}$ for $i=1, \ldots, n$ that satisfy the above set of inequalities. In one embodiment the following mathematical programming model may be solved with appropriate solver on the digital computer 202 to find $\mu^{x_i}$ for $i=1, \ldots, n$.

$$\min \sum_{i=1}^{n} \frac{\kappa^{x_i}}{\mu^{x_i}},$$

subject to $Q_{ii}(\mu^{x_i})^2 + q_i \mu^{x_i} \leq \frac{m_\ell}{\epsilon_\ell}$ for $i = 1, \ldots, n$, $\mu^{x_i} \leq \sqrt{\frac{m_c}{|Q_{cc}|\epsilon_c}}$ for $i = 1, \ldots n$: $Q_{ii} \neq 0$, $\mu^{x_i} \mu^{x_j} \leq \frac{m_c}{|Q_{ij}|\epsilon_c}$ for $i, j = 1, \ldots n$: $Q_{ij} \neq 0$.

In another embodiment a heuristic search algorithm may be employed for finding $\mu^{x_i}$ for $i=1, 2, \ldots, n$ that satisfy the above inequalities.

Computing a Bounded-Coefficient Encoding of the Integer Variable(s) and the System of Non-Degeneracy Constraints In some embodiments, the methods, systems, and media described herein include a series of steps for setting a system of superconducting qubits having a Hamiltonian representative of a polynomial on a bounded integer domain via bounded-coefficient encoding. In some embodiments, a processing step is shown to be computing a bounded-coefficient encoding of the integer variable(s) and the system of non-degeneracy constraints. Referring to FIG. 8 and processing step 806, the bounded-coefficient encoding and the system of non-degeneracy constraints are obtained.

Figure 13:
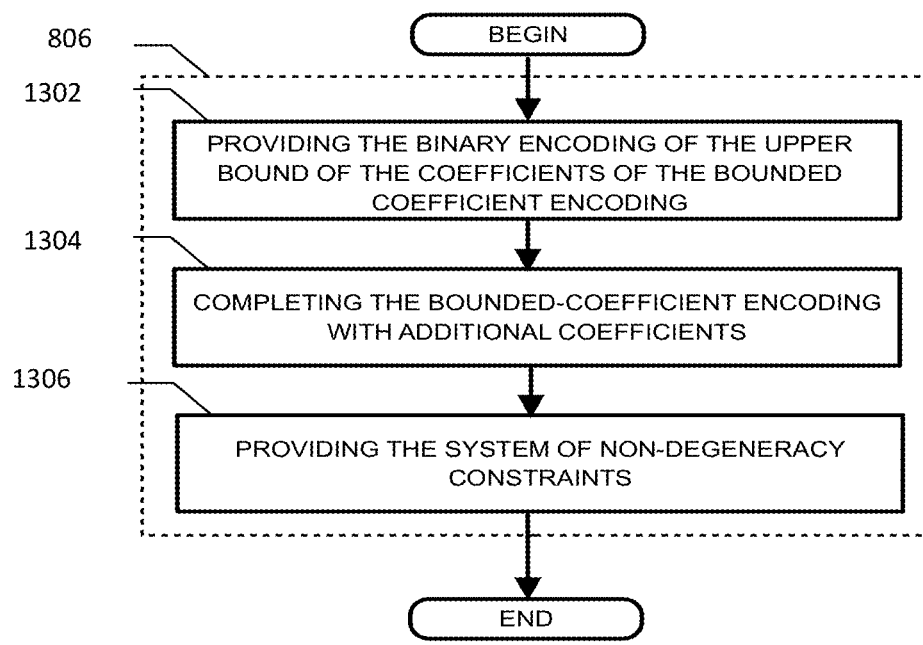
FIG. 13 shows a non-limiting example of a method for setting a system of superconducting qubits having a Hamiltonian representative of a polynomial on a bounded integer domain; in this case, a flowchart of a step for computing the bounded-coefficient encoding.

Referring to FIG. 13, in a particular embodiment, it explains how the bounded-coefficient encoding is derived. Herein, it denotes the upper bound on the integer variable x with $\kappa^x$, and the upper bound on the coefficients used in the integer encoding with $\mu^x$. According to processing step 1302, it derives the binary encoding of $\mu^x$. It sets $l_{\mu^x} = \lfloor \log_2 \mu^x + 1 \rfloor$. Then the binary encoding of $\mu$ is set to be $S_{\mu^x} = (2^{i-1}$:for $i=1, \ldots, l_{\mu^x})$.

It is appreciated that if $\kappa^x < 2^{l_{\mu^x}}$ then the binary encoding of $\kappa^x$ does not have any coefficients larger than $\mu^x$ and the processing step 1302 derives $$c_i^x = \begin{cases} 2^{i-1} & \text{for } i = 1, \ldots, \lfloor \log_2 \kappa^x \rfloor \\ \kappa^x - \sum_{i=1}^{\lfloor \log_2 \kappa^x \rfloor} 2^{i-1} & \text{for } i = \lfloor \log_2 \kappa^x \rfloor + 1 \end{cases},$$

and processing step 604 is skipped.

Still referring to FIG. 13 and according to processing step 1304, it completes the bounded-coefficient encoding if required (i.e., $\kappa^x \geq 2^{l_{\mu^x}}$) by adding $$\eta_{\mu^x} = \left\lfloor \frac{\left( \kappa^x - \sum_{i=0}^{l_{\mu^x}} 2^{i-1} \right)}{\mu^x} \right\rfloor$$

coefficients of value $\mu$, and one coefficient of value $\tau^x = \kappa^x - \sum_{i=0}^{l_{\mu^x}} 2^{i-1} - \eta_{\mu^x} \mu^x$ if $\tau$ is nonzero. Using the derived coefficients, the bounded-coefficient encoding is the integer encoding in which the coefficients are as follows:

$$c_i^x = \begin{cases} 2^{i-1}, & \text{for } i = 1, \ldots, \ell_{\mu^x}, \\ \mu^x, & \text{for } i = \ell_{\mu^x} + 1, \ldots, \ell_{\mu^x} + \eta_{\mu^x}, \\ \tau^x, & \text{for } i = \ell_{\mu^x} + \eta_{\mu^x} + 1 \text{ if } \tau^x \neq 0. \end{cases}$$

It is appreciated that the degree of the bounded-coefficient encoding is $$d^x = \begin{cases} \ell_{\mu^x} + \eta_{\mu^x} & \text{if } \tau^x = 0, \\ \ell_{\mu^x} + \eta_{\mu^x} + 1 & \text{otherwise.} \end{cases}$$

It is also appreciated that in the bounded-coefficient encoding the following identity is satisfied $$\sum_{i=1}^{d^x} c_i^x = \kappa^x.$$

For example, if one needs to encode an integer variable that takes maximum value of 24 with integer encoding that has maximum coefficient of 6, the bounded-coefficient encoding would be $c_1=1, c_2=2, c_3=4, c_4=6, c_5=6, c_5=5$.

It is appreciated that bounded-coefficient encoding may be derived according to various embodiment. In one embodiment, it is the output of a digital computer readable and executable subroutine.

Still referring to FIG. 13 and according to processing step 1306, a system of non-degeneracy constraints is provided. It is appreciated that the system of non-degeneracy constraints may be represented in various embodiments.

In one embodiment the system of non-degeneracy constraints is the following system of linear inequalities:

$$\sum_{i=1}^{\ell_{\mu^x}} y_i^x \geq y_{\ell_{\mu^x}+1}^x,$$

$y_i^x \geq y_{i+1}^x$, for $i = \ell_{\mu^x} + 1, \ldots, d^x$.

It is appreciated that the providing of the system of non-degeneracy constraints above may be carried by providing a matrix A of size $(d^x - l_{\mu^x} + 1) \times d^x$ with entries $-1, 0, 1$. In this embodiment the system of non-degeneracy constraints is represented by the following system $$A \begin{pmatrix} y_1^x \\ \vdots \\ y_{d^x}^x \end{pmatrix} \leq \begin{pmatrix} 0 \\ \vdots \\ 0 \end{pmatrix}.$$

Converting from Integer Domain to Binary Variables

In some embodiments, the methods, systems, and media described herein include a series of steps for setting a system of superconducting qubits having a Hamiltonian representative of a polynomial on a bounded integer domain via bounded-coefficient encoding. In some embodiments, a processing step is shown to be providing a polynomial in several binary variables equivalent to the provide polynomial on a bounded integer domain. Referring back to FIG.

8 and according to processing step 808, the provided polynomial on a bounded integer domain is converted to an equivalent polynomial in several binary variables.

Figure 14:
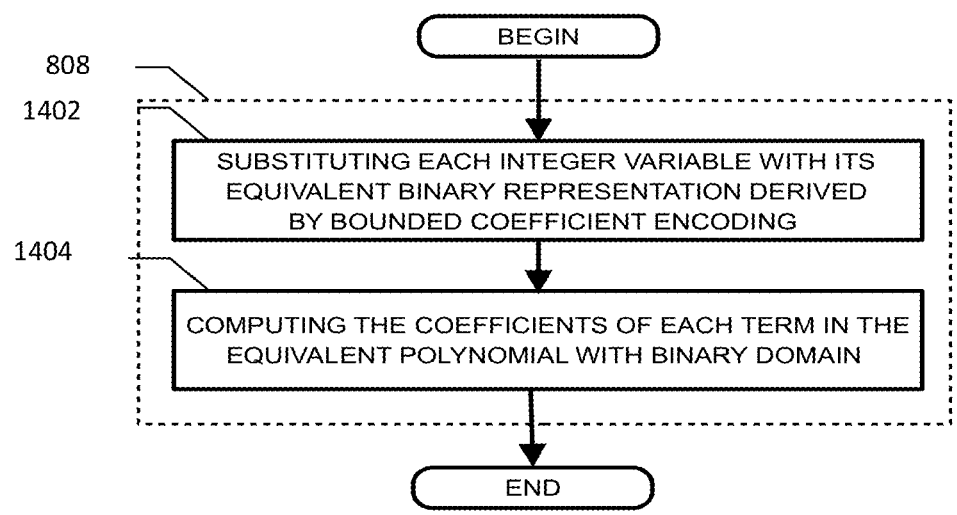
FIG. 14 shows a non-limiting example of a method for setting a system of superconducting qubits having a Hamiltonian representative of a polynomial on a bounded integer domain; in this case, a flowchart of a step for converting a polynomial on a bounded integer domain to an equivalent polynomial in several binary variables.

Referring to FIG. 14 and processing step 1402, each integer variable $x_i$ is represented with the following linear function $$x_i = \sum_{k=1}^{d^{x_i}} c_k^{x_i} y_k^{x_i},$$

of binary variables $y_k^{x_i}$ for $k=1, \ldots, d^{x_i}$.

Still referring to FIG. 14 and according to processing step 1404, the coefficients of the polynomial on binary variables equivalent to the obtained polynomial on bounded integer domain are computed.

For each variable $x_i$ in the obtained polynomial on a bounded integer domain, herein it introduces $d^{x_i}$ binary variables $y_1^{x_i}, y_2^{x_i}, \ldots, y_{d^{x_i}}^{x_i}$.

It is appreciated that the coefficients of the polynomial in several binary variables can be computed in various embodiments.

In one embodiment the computation of the coefficient of the polynomial in several binary variables may be performed according to the method disclosed in the documentation of the SymPy Python library for symbolic mathematics available online at http://docs.sympy.org/latest/modules/polys/internals.html in conjunction to the relations of type $y^m = y$ for all binary variables.

In a particular case that the obtained polynomial on a bounded integer domain is linear, the resulting polynomial in binary variables is also linear and the coefficient of each variable $y_k^{x_i}$ is $q_i c_k^{x_i}$ for $i=1, \ldots, n$ and $k=1, \ldots, d^{x_i}$.

In a particular case that the obtained polynomial on a bounded integer domain is of degree two, then the equivalent polynomial in binary variables is of degree two as well; the coefficients of variable $y_k^{x_i}$ is $q_i c_k^{x_i} + Q_{ii}(c_k^{x_i})^2$ for $i=1, \ldots, n$, and $k=1, \ldots, d^{x_i}$; the coefficients corresponding to $y_k^{x_i} y_l^{x_i}$ is $Q_{ii} c_k^{x_i} c_l^{x_i}$ for $i=1, \ldots n$, $k, l=1, \ldots, d^{x_i}$, and $k \neq l$; and the coefficients corresponding to $y_k^{x_i} y_l^{x_j}$ is $Q_{ij} c_k^{x_i} c_l^{x_j}$ for $i,j=1, \ldots, n$, $i \neq j$, $k=1, \ldots, d^{x_i}$, and $l=1, \ldots, d^{x_j}$.

Degree Reduction of the Polynomial in Several Binary Variables

In some embodiments, the methods, systems, and media described herein include a series of steps for setting a system of superconducting qubits having a Hamiltonian representative of a polynomial on a bounded integer domain via bounded-coefficient encoding. In some embodiments, a processing step is shown to be providing a degree reduced form of a polynomial in several binary variables. Referring back to FIG. 8 and according to processing step 810, it provides a polynomial of degree at most two in several binary variables equivalent to the provided polynomial in several binary variables.

It is appreciated that the degree reduction of a polynomial in several binary variables can be done in various embodiments. In one embodiment the degree reduction of a polynomial in several binary variables is done by the method described by H. Ishikawa, "Transformation of General Binary MRF Minimization to the First-Order Case," in IEEE Transactions on Pattern Analysis and Machine Intelligence, vol. 33, no. 6, pp. 1234-1249, June 2011]. In another embodiment, the degree reduction of a polynomial in several binary variables is done by the method described in by Martin Anthony, Endre Boros, Yves Crama, and Aritanan Gruber, 2016. Quadratization of symmetric pseudo-Boolean functions, Discrete Appl. Math. 203, C (April 2016), 1-12. (DOI=http://dx.doi.org/10.1016/j.dam.2016.01.001).

Assigning Variables to Qubits

In some embodiments, the methods, systems, and media described herein include a series of steps for setting a system of superconducting qubits having a Hamiltonian representative of a polynomial on a bounded integer domain via bounded-coefficient encoding. In some embodiments, a processing step is shown to be providing an assignment of binary variables of the polynomial of degree at most two equivalent to the provided polynomial on bounded integer domain to qubits. Referring back to FIG. 8 and according to processing step 812, it provides an assignment of the binary variables of the polynomial of degree at most two equivalent to the provided polynomial on bounded integer domain to qubits. In one embodiment the assignment of binary variables to qubits is according to a minor embedding algorithm from a source graph obtained from the polynomial of degree at most two in several binary variables equivalent to the provided polynomial on bounded integer domain to a target graph obtained from the qubits and couplings of the pairs of qubits in the system of superconducting qubits.

It is appreciated that a minor embedding from a source graph to a target graph may be performed according to various embodiments. In one embodiment, the algorithm used is as disclosed in Jun Cai, Bill Macready and Aidan Roy, "A practical heuristic for finding graph minors" (arXiv: 1406.2741) and in U.S. Patent Publication No. 2008/0218519 and U.S. Pat. No. 8,655,828 B2, each of which is entirely incorporated herein by reference.

Setting Local Field Biases and Couplers Strengths

In some embodiments, the methods, systems, and media described herein include a series of steps for setting a system of superconducting qubits having a Hamiltonian representative of a polynomial on a bounded integer domain via bounded-coefficient encoding. In some embodiments, a processing step is shown to be setting local field biases and couplings strengths. Referring back to FIG. 8 and according to processing step 814, the local field biases and couplings strengths on the system of superconducting qubits are tuned.

In the particular case that the obtained polynomial is linear, each logical variable is assigned a physical qubit and the local field bias of $q_i c_k^{x_i}$ is assigned to the qubit corresponding to logical variable $y_k^{x_i}$ for $i=1, \ldots, n$ and $k=1, \ldots, d^{x_i}$.

In the particular case where the obtained polynomial is of degree two or more, the degree reduced polynomial in several binary variables equivalent to the provided polynomial is quadratic, and the tuning of local field biases and coupling strength may be carried according to various embodiments. In one embodiment wherein the system of superconducting qubits is fully connected, each logical variable is assigned a physical qubit. In this case, the local field of qubit corresponding to variable y is set as the value of the coefficient of y in the polynomial of degree at most two in several binary variables. The coupling strength of the pair of qubits corresponding to variables y and y' is set as the value of the coefficient of yy' in the polynomial of degree at most two in several binary variables.

The following example, illustrates how the method disclosed in this application may be used to recast a mixed-integer polynomially constrained polynomial programming problem to a binary polynomially constrained polynomial programming problem. Consider the optimization problem $$\min(x_1+x_3)^2+x_2,$$

subject to $x_1+(x_2)^3 \leq 9$, $x_1, x_2 \in \mathbb{Z}_+,$ $x_3 \in \{0,1\}.$ The above problem is a mixed-integer polynomially constrained polynomial programming problem in which all the polynomials are of degree at most three. According to the constraint an upper bound for the integer variable $x_1$ is 9 and an upper bound for the integer variable $x_2$ is 2.

Suppose one wants to convert this problem to an equivalent binary polynomially constrained polynomial programming with an integer encoding that has coefficient of at most three. The bounded-coefficient encoding for $x_1$ is $c_1^{x_1}=1$, $c_2^{x_1}=2$, $c_3^{x_1}=3$, $c_4^{x_1}=3$ and the bounded-coefficient encoding for $x_2$ is $c_1^{x_2}=1$, $c_2^{x_2}=1$. The formal presentations for $x_1$ and $x_2$ are $x_1 = y_1^{x_1} + 2y_2^{x_1} + 3y_3^{x_1} + 3y_4^{x_1},$ $x_2 = y_1^{x_2} + y_2^{x_2}.$ Substituting the above linear functions for $x_1$ and $x_2$ in the mixed integer polynomially constrained polynomial programming problem it will attain the following equivalent binary polynomially constrained polynomial programming problem:

$\min(y_1^{x_1} + 2y_2^{x_1} + 3y_3^{x_1} + 3y_4^{x_1} + x_3)^2 + y_1^{x_2} + y_1^{x_2},$ subject to $y_1^{x_1} + 2y_2^{x_1} + 3y_3^{x_1} + 3y_4^{x_1} + (y_1^{x_2} + y_2^{x_2})^3 \leq 9,$ $x_3, y_1^{x_1}, y_2^{x_1}, y_3^{x_1}, y_4^{x_1}, y_1^{x_2}, y_2^{x_2} \in \{0,1\}.$ If required, it can rule out degenerate solutions by adding the system of non-degeneracy constraints provided by the method disclosed in this application, to the derived binary polynomially constrained polynomial programming problem as mentioned above. For the presented example, the final binary polynomially constrained polynomial programming problem is:

$\min(y_1^{x_1} + 2y_2^{x_1} + 3y_3^{x_1} + y_4^{x_1} + x_3)^2 + y_1^{x_2} + y_2^{x_2},$ subject to $y_1^{x_1} + 2y_2^{x_1} + 3y_3^{x_1} + 3y_4^{x_1} + (y_1^{x_2} + y_2^{x_2})^3 \leq 9,$ $y_1^{x_1} + y_2^{x_1} \geq y_3^{x_1},$ $y_3^{x_1} \geq y_4^{x_1},$ $y_1^{x_2} \geq y_2^{x_2},$ $x_3, y_1^{x_1}, y_2^{x_1}, y_3^{x_1}, y_4^{x_1}, y_1^{x_2}, y_2^{x_2} \in \{0,1\}.$ In this particular cases the first constraint of the above problem is of degree three and in the form of $y_1^{x_1} + 2y_2^{x_1} + 3y_3^{x_1} + 3y_4^{x_1} + (y_1^{x_2})^3 + 3(y_1^{x_2})^2(y_2^{x_2}) + 3(y_1^{x_2})(y_2^{x_2})^2 + (y_2^{x_2})^3 \leq 9,$ which can be equivalently represented as the degree reduced form of $y_1^{x_1} + 2y_2^{x_1} + 3y_3^{x_1} + 3y_4^{x_1} + (y_1^{x_2}) + 6(y_1^{x_2})(y_2^{x_2}) + (y_2^{x_2}) \leq 9.$ Digital Processing Device In some embodiments, the quantum-ready software development kit (SDK) described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the quantum-ready software development kit (SDK) disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the quantum-ready software development kit (SDK) disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application may be created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the quantum-ready software development kit (SDK) disclosed herein include software, server, and/or database modules, or use of the same. In view of the disclosure provided herein, software modules may be created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the quantum-ready software development kit (SDK) disclosed herein include one or more databases, or use of the same. In view of the disclosure provided herein, those of skill in the art will recognize that many databases are suitable for storage and retrieval of application information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for using a digital computer to generate and direct a computational task to a quantum computing resource comprising at least one quantum computer over a network, wherein said digital computer comprises at least one computer processor and at least one computer memory, said method comprising:
   (a) retrieving a programming problem from said computer memory of said digital computer;
   (b) using said at least one computer processor of said digital computer to generate an equivalent of said programming problem;
   (c) generating a request comprising said equivalent of said programming problem generated by said at least one computer processor of said digital computer; and
   (d) directing said request from said digital computer to said quantum computing resource over said network, wherein said equivalent of said programming problem is usable by said at least one quantum computer of said quantum computing resource to solve said programming problem.

2. The method of claim 1, wherein said request is directed from said digital computer to said quantum computing resource through a cloud-based interface.

3. The method of claim 1, wherein said network is a local network.

4. The method of claim 1, wherein said at least one quantum computer performs one or more quantum algorithms to said programming problem.

5. The method of claim 1, wherein said request is generated using an application programming interface (API).

6. The method of claim 1, wherein (a) comprises obtaining (i) a polynomial on a bounded integer domain and (ii) integer encoding parameters, and wherein (b) comprises computing a bounded-coefficient encoding using said integer encoding parameters.

7. The method of claim 6, wherein (b) further comprises using said at least one computer processor to transform each integer variable of said polynomial to a linear function of binary variables using said bounded-coefficient encoding.

8. The method of claim 7, further comprising providing constraints on said binary variables to avoid degeneracy in said bounded-coefficient encoding, if required by a user.

9. The method of claim 7, further comprising substituting each integer variable of said polynomial with an equivalent binary representation, and using said at least one computer processor to compute coefficients of said equivalent binary representation of said polynomial on said bounded integer domain.

10. The method of claim 9, further comprising performing a degree reduction on said equivalent binary representation of said polynomial on said bounded integer domain to generate an equivalent polynomial.

11. The method of claim 10, wherein said equivalent polynomial is of a degree of at most two in binary variables.

12. The method of claim 11, further comprising setting local field biases and coupling strengths on said at least one quantum computer using said coefficients of said equivalent polynomial of said degree of at most two in binary variables to generate said equivalent of said programming problem.

13. The method of claim 12, wherein said equivalent of said programming problem comprises a Hamiltonian representative of said polynomial on said bounded integer domain.

14. The method of claim 13, wherein said Hamiltonian is usable by said at least one quantum computer to solve said programming problem.

15. A system comprising a digital computer for generating and directing a computational task to a quantum computing resource comprising at least one quantum computer over a network, wherein said digital computer comprises at least one computer processor and at least one computer memory, wherein said at least one computer processor is programmed to:
   (a) retrieve a programming problem from said computer memory of said digital computer;
   (b) use said at least one computer processor of said digital computer to generate an equivalent of said programming problem;
   (c) generate a request comprising said equivalent of said programming problem generated by said at least one computer processor of said digital computer; and
   (d) direct said request from said digital computer to said quantum computing resource over said network, wherein said equivalent of said programming problem is usable by said at least one quantum computer of said quantum computing resource to solve said programming problem.

16. The system of claim 15, wherein said at least one computer processor is programmed to direct said request from said digital computer to said quantum computing resource through a cloud-based interface.

17. The system of claim 15, wherein said network is a local network.

18. The system of claim 15, wherein said at least one computer processor is programmed to obtain (i) a polynomial on a bounded integer domain and (ii) integer encoding parameters, and compute a bounded-coefficient encoding using said integer encoding parameters.

19. The system of claim 18, wherein said at least one computer processor is programmed to (i) transform each integer variable of said polynomial to a linear function of binary variables using said bounded-coefficient encoding, and (ii) substitute each integer variable of said polynomial with an equivalent binary representation, and compute coefficients of an equivalent binary representation of said polynomial on said bounded integer domain.

20. The system of claim 19, wherein said at least one computer processor is programmed to perform a degree reduction on said equivalent binary representation of said polynomial on said bounded integer domain to generate an equivalent polynomial, wherein said equivalent polynomial is of a degree of at most two in binary variables.

21. The system of claim 20, wherein said at least one computer processor is programmed to set local field biases and coupling strengths on said at least one quantum computer using said coefficients of said equivalent polynomial of said degree of at most two in binary variables to generate said equivalent of said programming problem.

22. The system of claim 21, wherein said equivalent of said programming problem comprises a Hamiltonian representative of said polynomial on said bounded integer domain.

23. The system of claim 22, wherein said Hamiltonian is usable by said at least one quantum computer to solve said programming problem.

* * * * *